US008600652B2

(12) United States Patent
Mizutani

(10) Patent No.: US 8,600,652 B2
(45) Date of Patent: Dec. 3, 2013

(54) CRANE OPERATION EVALUATION DEVICE

(75) Inventor: Motohiko Mizutani, Akashi (JP)

(73) Assignee: Kobelco Cranes Co., Ltd., Tokyo (JP)

( * ) Notice: Subject to any disclaimer, the term of this patent is extended or adjusted under 35 U.S.C. 154(b) by 39 days.

(21) Appl. No.: 13/143,360

(22) PCT Filed: Dec. 24, 2009

(86) PCT No.: PCT/JP2009/071400
§ 371 (c)(1),
(2), (4) Date: Jul. 6, 2011

(87) PCT Pub. No.: WO2010/079691
PCT Pub. Date: Jul. 15, 2010

(65) Prior Publication Data

US 2011/0276261 A1 Nov. 10, 2011

(30) Foreign Application Priority Data

Jan. 7, 2009 (JP) ................................ 2009-001623

(51) Int. Cl.
*G06F 19/00* (2011.01)

(52) U.S. Cl.
USPC ............................................ 701/123; 701/50

(58) Field of Classification Search
USPC .................................................... 701/123, 50
See application file for complete search history.

(56) References Cited

U.S. PATENT DOCUMENTS

| | | | | |
|---|---|---|---|---|
| 4,462,079 | A * | 7/1984 | Ito et al. | 701/123 |
| 2003/0023325 | A1 * | 1/2003 | Adachi et al. | 700/9 |
| 2006/0287841 | A1 | 12/2006 | Hoshi et al. | |
| 2008/0249679 | A1 | 10/2008 | Matsuda et al. | |

FOREIGN PATENT DOCUMENTS

| | | | |
|---|---|---|---|
| CN | 1839233 | A | 9/2006 |
| CN | 200999182 | Y | 1/2008 |
| JP | 1 131982 | | 5/1989 |
| JP | 2004 270580 | | 9/2004 |
| JP | 2005 98988 | | 4/2005 |
| JP | 2007 204208 | | 8/2007 |
| JP | 2008 240361 | | 10/2008 |

OTHER PUBLICATIONS

International Search Report Issued Apr. 6, 2010 in PCT/JP09/071400 filed Dec. 24, 2009.

(Continued)

*Primary Examiner* — James Trammell
*Assistant Examiner* — Jerrah Edwards
(74) *Attorney, Agent, or Firm* — Oblon, Spivak, McClelland, Maier & Neustadt, L.L.P.

(57) ABSTRACT

A crane operation evaluation device for evaluating an operation status of an operator of a crane performing a crane work by using drive power of an engine. The crane operation evaluation device includes: a display device provided at a position of the crane that is visible to the operator and serving to display predetermined data; a detector for detecting a state of a given part of the crane; and a data control unit that, after a stopping operation of the engine, derives a first fuel consumption index for analyzing a fuel consumption efficiency of the crane work performed between the most recent start of the engine and the stop of the engine by the stopping operation and a first work index for analyzing content of such crane work, on the basis of detection data of the detector, and causes the display device to display the derived first fuel consumption index and first work index.

7 Claims, 25 Drawing Sheets

(56) References Cited

OTHER PUBLICATIONS

Extended European Search Report issued Dec. 5, 2011, in Patent Application No. 09837576.9.

Combined Chinese Office Action and Search Report issued Dec. 31, 2012, in Chinese Patent Application No. 200980154140.1 with partial English translation and with English translation of category of cited documents.

* cited by examiner

FIG.13C

| RECORD OF CRANE WORK IN THE PRESENT DAY | | | | | |
|---|---|---|---|---|---|
| NUMBER OF SUSPENSION WORKS | IN THE PRESENT DAY | 97 time | MOMENT -TIME | IN THE PRESENT DAY | 1,341 tmh |
| | ACCUMULATED TOTAL | 22,467 time | | ACCUMULATED TOTAL | 119,159 tmh |
| MAXIMUM LOAD RATIO | 85.1% | | MAXIMUM ACTUAL LOAD | | 35.7t |

| RECORD OF OVERLOAD PREVENTING DEVICE IN THE PRESENT DAY (NUMBER/TIME RELATIONSHIP) | | | | |
|---|---|---|---|---|
| OVERLOAD | 0 time | MASTER KEY IS CANCELED | 0 time | 0 sec |
| HOOK OVER -HOISTING | 0 time | OVERLOAD IS CANCELED | 0 time | 0 sec |
| BOOM OVER -HOISTING | 0 time | HOOK OVER-HOISTING IS CANCELED | 0 time | 0 sec |
| JIB OVER -HOISTING | 0 time | RAISING-LOWERING OVER -HOISTING IS CANCELED | 0 time | 0 sec |

| INFORMATION OCCURRENCE STATUS FOR THE PRESENT DAY AND AT PRESENT TIME | | | | | | |
|---|---|---|---|---|---|---|
| SAFETY INFORMATION | OCCURRENCE | 0 | CANCELED | 0 | PRESENT | 0 |
| OTHER INFORMATION | OCCURRENCE | 0 | CANCELED | 0 | PRESENT | 0 |

| COMMUNICATION STATUS CONFIRMATION IN THE PRESENT DAY | |
|---|---|
| TOTAL NUMBER OF TRANSMISSIONS IN THE PRESENT DAY | 1 time |

| POSITION INFORMATION IN THE PRESENT DAY | | | |
|---|---|---|---|
| GPS NEWEST STATE | NORMAL | OUT-OF-AREA ALARM | OUT-OF-AREA |
| AVERAGE WIND VELOCITY VALUE | 1.5 m/s | MAXIMUM WIND VELOCITY VALUE | 7.3 m/s |

| FOR CUSTOMER INPUT | OCCURRENCE TIME | 10 h | 57 min |
|---|---|---|---|

FIG.13D

| | | | | | | | | | | | | | | | |
|---|---|---|---|---|---|---|---|---|---|---|---|---|---|---|---|
| 300~ | | | | | | | | | | | | | | | |
| ~300 | | | | | | | | | | | | | | | |
| ~200 | | | | | | | | | | | | | | | |
| ~150 | | | | | | | | | | | | | | | |
| ~100 | | | | | | | | | | | | | | | |
| ~80 | | | | | | | | | | | | | | | |
| ~60 | | | | | | | | | | | | | | | |
| ~50 | | | | | | | | | | | | | | | |
| ~40 | | | 7 | 2 | | | | | | | | | | | |
| ~30 | | | 73 | 14 | 2 | | | | | | | | | | |
| ~20 | | | 33 | 9 | 1 | | | | | | | | | | |
| ~15 | | | 50 | 37 | 22 | | | | | | | | | | |
| ~10 | | | 38 | 19 | 10 | 1 | | | | | | | | | |
| ~5 | | | 7 | 10 | 6 | 1 | | | | | | | | | |
| ~2 | | | 7 | 21 | 49 | 1 | | | | | | | | | |
| t/m | 5 | 10 | 15 | 20 | 25 | 30 | 35 | 40 | 50 | 60 | 70 | 80 | 90 | 100 | – |
| LOAD RATIO % | 5 | 10 | 15 | 20 | 25 | 30 | 35 | 40 | 50 | 60 | 70 | 80 | 90 | 100 | – |
| SUSPENTION WORKS | 85 | 18 | 49 | 18 | 49 | 42 | 22 | 41 | 55 | 34 | 10 | 2 | 0 | | |
| LOAD LEVEL | 1 | 2 | 3 | 4 | 5 | 6 | 7 | 8 | 9 | 10 | 11 | 12 | 13 | 14 | 15 |
| F.W | 6 | 23 | 1 | 2 | 17 | 2 | | | | | | | | | |
| R.W. | | | | | | | | | | | | | | | |
| 3rd.W. | | | | | | | | | | | | | | | |
| BOOM W | 0 | 21 | 10 | 44 | 12 | 2 | 2 | 0 | | | | | | | |
| JIB W | | | | | | | | | | | | | | | |
| RPM(*100) | 7 | 8 | 9 | 10 | 11 | 12 | 13 | 14 | 15 | 16 | 17 | 18 | 19 | 20 | 20≦ |
| E/G REVOLUTION SPEED | 2 | 334 | 53 | 12 | 7 | 5 | 3 | 2 | 2 | 1 | 1 | 1 | 0 | 0 | 0 |
| E/G DURING HOISTING | 0 | 25 | 34 | 10 | 2 | 2 | 1 | 1 | 1 | 1 | 1 | 0 | 0 | 0 | 0 |
| E/G DURING LOWERING | 0 | 27 | 14 | 6 | 2 | 1 | 1 | 0 | 0 | 0 | 0 | 0 | 0 | 0 | 0 |
| INTERVAL (sec) | 2 | 5 | 10 | 15 | 20 | 30 | 60 | 90 | 120 | 300 | 600 | 1200 | 1800 | 3600 | 3600≦ |
| OPERATION INTERVAL | 2 | 5 | 6 | 5 | 6 | 7 | 13 | 6 | 6 | 16 | 13 | 18 | 21 | 33 | 93 |
| PART REPLACEMENT STATUS | | | | | | | | | | | | | | | |

UNIT: hour

600~
~600
~300
~120
~60
~30
~10
~5
~3
0~1

| | | | | |
|---|---|---|---|---|
| SITE NAME | | | NACHINE NAME | ENGINE TYPE |
| OPERATOR | | | BM800HD-2F | |
| CUSTOMER NAME | | CUSTOMER MACHINE MANAGEMENT NUMBER | MACHINE NUMBER | ENGINE NUMBER |
| | | | GD04-030XX | |

| | | | | | |
|---|---|---|---|---|---|
| TRAVELING TIME | 0:08 | 0.2% |  | END TIME, HOUR METER | 1606 h |
| SLEWING TIME | 10:04 | 17.2% | | | |
| CRANE OPERATION TIME | 30:00 | 51.2% | | TOTAL RUNNING TIME IN THE PRESENT WEEK | 58 h 29 min |
| IDLE TIME | 8:49 | 15.3% | | | |
| SETUP TIME | 9:26 | 16.1% | | | |
| ENGINE RUNNING STATUS IN THE PRESENT WEEK | | | | h/min | m/s h/min |

FIG.14C

| ENGINE RUNNING STATUS IN THE PRESENT WEEK | | | | | | | | | | | | | | | | | | | | | | | | | | h/min | m/s | h/min |
|---|---|---|---|---|---|---|---|---|---|---|---|---|---|---|---|---|---|---|---|---|---|---|---|---|---|---|---|---|
| DATE/h | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | RUNNING TIME | AVERAGE WIND VELOCITY | MAXIMUM WIND VELOCITY | MAXIMUM WIND VELOCITY WAS OBSERVED |
| 12/13 | | | | | | | | | | | | | | | | | | | | | | | | | 9:35 | 1.5 | 7.9 | 15:33 |
| 12/14 | | | | | | | | | | | | | | | | | | | | | | | | | 10:12 | 2.3 | 7.9 | 10:26 |
| 12/15 | | | | | | | | | | | | | | | | | | | | | | | | | 10:11 | 1.5 | 6.5 | 13:36 |
| 12/16 | | | | | | | | | | | | | | | | | | | | | | | | | 10:33 | 1.7 | 7.4 | 11:45 |
| 12/17 | | | | | | | | | | | | | | | | | | | | | | | | | 13:19 | 2.6 | 8.2 | 16:36 |
| 12/18 | | | | | | | | | | | | | | | | | | | | | | | | | 13:50 | 2.6 | 8.2 | 13:36 |
| 12/19 | | | | | | | | | | | | | | | | | | | | | | | | | 1:19 | 2.7 | 7.4 | 13:17 |

FIG.14D

| RECORD OF CRANE WORK IN THE PRESENT WEEK | | | | | |
|---|---|---|---|---|---|
| NUMBER OF SUSPENSION WORKS | IN THE PRESENTWEEK | 590 time | MOMENT -TIME | IN THE PRESENTWEEK | 2,246 tmh |
| | ACCUMULATED TOTAL | 151,148 time | | ACCUMULATED TOTAL | 124,447 tmh |
| MAXIMUM LOAD RATIO | 102.0% | | MAXIMUM ACTUAL LOAD | 34.5t | |
| NUMBER OF WEEKLY REGULAR TRANSMISSIONS | 7 time | | NUMBER OF NON- REGULAR TRANSMISSIONS | 71 time | |
| M/L CODE ON WEEKEND /WINDING NUMBER | 1100800120210 | 4 | 1 | 0 | |
| NUMBER OF TIMES THE M/L CODE IS CHANGED | 1 | NEWEST ATT FORM CHANGE | CR | | |
| NUMBER OF ASSEMBLY/DISASSEMBLY MODE | 1 | NUMBER OF ATT FORM CHANGES | 1 | | |

| RECORD OF OVERLOAD PREVENTING DEVICE IN THE PRESENT WEEK (NUMBER/TIME RELATIONSHIP) | | | | | | |
|---|---|---|---|---|---|---|
| OVERLOAD | 2 time | MASTER KEY IS CANCELED | 0 time | 0 sec | | |
| HOOK OVER-HOISTING | 1 time | OVERLOAD IS CANCELED | 0 time | 0 sec | | |
| BOOM OVER-HOISTING | 0 time | HOOK OVER-HOISTING IS CANCELED | 0 time | 0 sec | | |
| JIB OVER-HOISTING | 0 time | RAISING-LOWERING OVER-HOISTING IS CANCELED | 0 time | 0 sec | | |
| SAFETY INFORMATION OCCURRENCE STATUS FOR THE PRESENT WEEK | | | | | | |
| SAFETY INFORMATION | OCCURRENCE | 3 | CANCELED | 3 | PRESENT | 0 |
| OTHER INFORMATION | OCCURRENCE | 0 | CANCELED | 0 | PRESENT | 0 |

| RPM(*100) | <7 | <8 | <9 | <10 | <11 | <12 | <13 | <14 | <15 | <16 | <17 | <18 | <19 | <20 | 20≦ |
|---|---|---|---|---|---|---|---|---|---|---|---|---|---|---|---|
| E/G REVOLUTION SPEED | 22 | 2163 | 284 | 271 | 224 | 215 | 150 | 78 | 40 | 21 | 19 | 7 | 2 | 2 | 3 |
| E/G DURING HOISTING | 5 | 398 | 89 | 108 | 91 | 91 | 71 | 49 | 27 | 15 | 15 | 5 | 1 | 1 | 1 |
| E/G DURING LOWERING | 2 | 151 | 28 | 24 | 18 | 13 | 7 | 4 | 2 | 2 | 2 | 1 | 0 | 0 | 0 |
| INTERVAL (sec) | <2 | <5 | <10 | <15 | <20 | <30 | <60 | <90 | <120 | <300 | <600 | <1200 | <1800 | <3600 | 3600≦ |
| OPERATION INTERVAL | 33 | 61 | 87 | 43 | 39 | 70 | 92 | 74 | 41 | 175 | 135 | 105 | 143 | | |

FIG.15B

| SITE NAME | | MACHINE NAME | ENGINE TYPE |
|---|---|---|---|
| OPERATOR | | 7200-2 | |
| CUSTOMER NAME | CUSTOMER MACHINE MANAGEMENT NUMBER | MACHINE NUMBER | ENGINE NUMBER |
| | 7200-2#XX | JD03-010XX | |

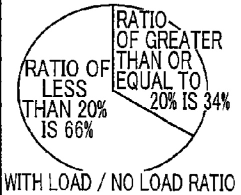

WITH LOAD / NO LOAD RATIO

| | | |
|---|---|---|
| TRAVELING TIME | 7:25 | 0.7% |
| SLEWING TIME | 79:19 | 7.9% |
| CRANE OPERATION TIME | 338:48 | 33.8% |
| IDLE TIME | 378:50 | 38.5% |
| SETUP TIME | 195:10 | 19.5% |

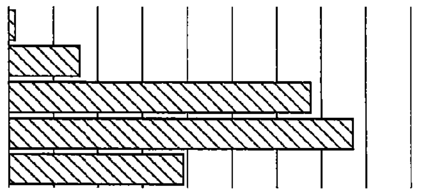

| | |
|---|---|
| PERIOD END, HOUR METER | 3328 h |
| RUNNING TIME IN THE PERIOD | 999 h 33 min |

RELATED TO OVERLOAD PREVENTING DEVICE IN THE PRESENT DAY (RELATED TO SAFETY)

| ITEM | OVERLOAD | HOOK OVER -HOISTING | BOOM OVER -HOISTING | JIB OVER -HOISTING | MASTER KEY IS CANCELED | OVERLOAD IS CANCELED | HOOK OVER -HOISTING IS CANCELED | RAISING-LOWERING OVER -HOISTING IS CANCELED |
|---|---|---|---|---|---|---|---|---|
| OCCURRENCE/OPERATION NUMBER (NUMBER) | 114 | 48 | 81 | 19 | 0 | 0 | 0 | 0 |
| OCCURRENCE/OPERATION RATIO (NUMBER/DAY) | 1.14 | 0.48 | 0.81 | 0.19 | 0.00 | 0.00 | 0.00 | 0.00 |

FIG.15C

| SAFETY INFORMATION OCCURRENCE FREQUENCY | | | | |
|---|---|---|---|---|
| ITEM | NUMBER OF OCCURRENCES | NUMBER OF OCCURRENCES PER DAY | NUMBER OF CANCELATIONS | PERIOD END |
| SAFETY INFORMATION | 0 | 0.00 | 0 | 0 |
| OTHER INFORMATION | 1 | 0.01 | 1 | 0 |

| | | | | | | | | | |
|---|---|---|---|---|---|---|---|---|---|
| M/L CODE AT PERIOD END | 1111200100410 | 4 | 1 | 0 | NUMBER OF RUNNING DAYS | | 166 | FUEL CONSUMPTION AMOUNT IN THE PERIOD | – |
| NUMBER OF TIMES THE M/L CODE IS CHANGED | 4 | ATT FORM AT PERIOD END | | CR | NUMBER OF COMMUNI-CATIONS | NON- REGULAR | 379 | FUEL CONSUMPTION ON CARGO HANDLING WORK | – |
| NUMBER OF ASSEMBLY/DISASSEMBLY MODES | 22 | NUMBER OF ATT FORM CHANGES | | 1 | | REGULAR | 206 | NUMBER OF TIMES THE ENGINE WAS STARTED | 723 |

| CR | | | | | | TW | |
|---|---|---|---|---|---|---|---|
| | | 43 | | NUMBER OF DAYS | 123 | | |
| TRAVELING TIME | 3:36 | 6,283 | | NUMBER OF SUSPENSION WORKS | 10,226 | TRAVELING TIME | 3:49 |
| SLEWING TIME | 33:50 | | | | | SLEWING TIME | 45:29 |
| CRANE OPERATION TIME | 84:59 | 60,001 | | MOMENT -TIME | 30,597 | CRANE OPERATIO | 253:49 |
| IDLE TIME | 129:00 | | | | | IDLE TIME | 444:58 |
| SETUP TIME | 0:00 | 706.0 | | AVERAGE MOMENT | 120.5 | SETUP TIME | 0:00 |
| MODE TOTAL TIME | 251:26 | | | | | MODE TOTAL TIME | 748:06 |
| MAXIMUM ACTUAL LOAD | 34.6t | 29.8t | AVERAGE VALUE OF MAXIMUM ACTUAL LOAD | | 5.9t | MAXIMUM ACTUAL LOAD | 22.4t |

CRANE OPERATION EVALUATION DEVICE

TECHNICAL FIELD

The present invention relates to a crane operation evaluation device.

BACKGROUND ART

Operators have been stimulated to reduce fuel consumption by displaying indexes for reducing fuel consumption on a display means in a work mechanism such as a shovel (see, for example, Patent Document 1).

In the shovel disclosed in Patent Document 1, fuel consumption per unit time or fuel consumption per work amount is measured during the work, and the difference between the measured fuel consumption per unit time and a target value of fuel consumption per unit time that has been set, or the difference between the measured fuel consumption per work amount and a target value of fuel consumption per work amount that has been set is displayed on a display means. Further, in this shovel, when the measured fuel consumption per unit time is larger than the target value of fuel consumption per unit time, or when the measured fuel consumption per work amount is larger than the target value of fuel consumption per work amount, a guidance instructing to improve fuel efficiency is displayed on the display means.

However, with the technique disclosed in Patent Document 1, the display for improving fuel efficiency is performed on the display means during the work and therefore the concentration of operator is divided between the crane work and the recognition of the display contents. As a result, the operator cannot sufficiently maintain the accuracy of crane work and also cannot sufficiently review the work contents for improving fuel efficiency. Further, where attention is called only to the improvement of fuel efficiency, without demonstrating the work results, as in the technique disclosed in Patent Document 1, the total cost reduction is impossible to achieve. Thus, even if fuel consumption is low, where a very small work has been performed, the actual cost of this work can be high.

Patent Document 1: Japanese Patent Application Publication No. 2005-98988.

SUMMARY OF INVENTION

It is an object of the present invention to provide a crane operation evaluation device that resolves the above-described problems.

It is another object of the present invention to provide a crane operation evaluation device that enables the operator both to maintain the accuracy of crane work and to review the work contents and also makes it possible to reduce the total cots of crane work.

The crane operation evaluation device according to one aspect of the present invention is a crane operation evaluation device for evaluating an operation status of an operator of a crane performing a crane work by using drive power of an engine, and this crane operation evaluation device includes: a display device provided at a position of the crane that is visible to the operator and serving to display predetermined data; a detector for detecting a state of a given part of the crane; and a data control unit that, after a stopping operation of the engine, derives a first fuel consumption index for analyzing a fuel consumption efficiency of the crane work performed between the most recent start of the engine and the stop of the engine by the stopping operation and a first work index for analyzing content of such crane work, on the basis of detection data of the detector, and causes the display device to display the derived first fuel consumption index and first work index.

BRIEF DESCRIPTION OF THE DRAWING

FIG. 13C shows an enlarged view of contents displayed in a region X2 of FIG. 13A.

FIG. 13D shows an enlarged view of contents displayed in a region X3 of FIG. 13A.

FIG. 14C shows an enlarged view of contents displayed in a region X5 of FIG. 14A.

FIG. 14D shows an enlarged view of contents displayed in a region X6 of FIG. 14A.

FIG. 15B shows an enlarged view of contents displayed in a region X7 of FIG. 15A.

FIG. 15C shows an enlarged view of contents displayed in a region X8 of FIG. 15A.

MODE FOR CARRYING OUT THE INVENTION

The embodiments of the present invention will be described below with reference to the appended drawings.

First, the configuration of a crane 100 using the operation evaluation device of one embodiment of the present invention will be described below with reference to FIG. 1 and FIG. 2.

Figure 1:
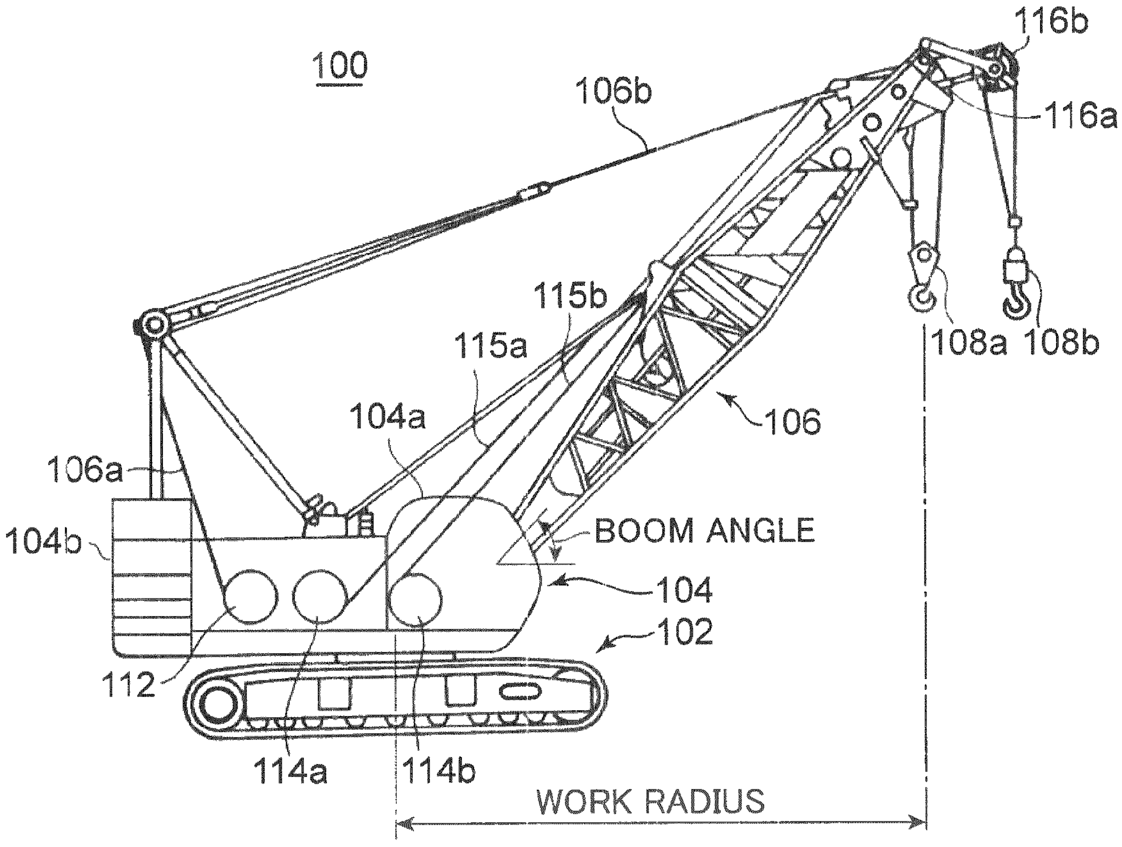
FIG. 1 is a schematic side view of the crane using the crane operation evaluation device of one embodiment of the present invention.

As shown in FIG. 1, the crane 100 is a crawler crane. The crane 100 includes a crawler-type lower propelling body 102, an upper slewing body 104 serving as a crane main body and installed on the lower propelling body 102 so that the upper slewing body can rotate about the vertical axis, a boom 106 serving as a raising/lowering member mounted on the upper slewing body 104 so that the boom can be raised and lowered, and a main hook 108*a* and an auxiliary hook 108*b* as suspended loading parts that hang down from a tip of the boom 106. The crane 100 is also provided with an engine 109 (see FIG. 2). The following operations are performed in the crane 100 by using drive power of the engine 109: an operation of causing the lower propelling body 102 to travel, an operation of slewing the upper slewing body 104, an operation of raising or lowering the boom 106, and operations of hoisting and lowering the hooks 108*a*, 108*b*.

More specifically, the crane 100 is provided with a hydraulic mechanism 110 (see FIG. 2) that receives drive power of the engine 109 and thereby supplies an oil pressure. The operations of causing the lower propelling body 102 to travel, slewing the upper slewing body 104, raising or lowering the boom 106, and hoisting and lowering the hooks 108*a*, 108*b* are actuated by the oil pressure supplied by the hydraulic mechanism 110.

The upper slewing body 104 carries a boom raising-lowering winch 112, a main hoisting winch 114*a*, and an auxiliary hoisting winch 114*b* that are driven by the oil pressure supplied by the hydraulic mechanism 110.

The boom raising-lowering winch 112 serves to raise or lower the boom 106. A boom raising-lowering rope 106*a* is wound about a drum of the boom raising-lowering winch 112. The boom raising-lowering rope 106*a* is wound or paid out by the boom raising-lowering winch 112, thereby raising or lowering the boom 106 via the boom raising-lowering rope 106*a* and a guy line 106*b* linked to the boom raising-lowering rope and connected to the tip portion of the boom 106.

The main hoisting winch 114*a* serves to hoist or lower the main hook 108*a*. A main hoisting rope 115*a* is wound about a drum of the main hoisting winch 114*a*. The main hoisting rope 115*a* is pulled out from the drum of the main hoisting winch 114*a*, held by a sheave 116*a* located at the tip of the boom 106, and allowed to hang down. The main hoisting rope 115*a* suspends the main hook 108*a* in a multiple rope turn state. The main hook 108*a* is hoisted or lowered by winding or unwinding the main hoisting rope 115*a* by the main hoisting winch 114*a*. The main hoisting and suspension operation of hoisting or lowering a heavy-weight load at a low speed is mainly performed by hoisting or lowering the main hook 108*a*.

The auxiliary hoisting winch 114*b* serves to hoist or lower the auxiliary hook 108*b*. An auxiliary hoisting rope 115*b* is wound about a drum of the auxiliary hoisting winch 114*b*. The auxiliary hoisting rope 115*b* is pulled out from the drum of the auxiliary hoisting winch 114*b*, held by a sheave 116*b* located at the tip of the boom 106, and allowed to hang down. The auxiliary hoisting rope 115*b* suspends the auxiliary hook 108*b* in a multiple rope turn state. The auxiliary hook 108*b* is hoisted or lowered by winding or unwinding the auxiliary hoisting rope 115*b* by the auxiliary hoisting winch 114*b*. An auxiliary hoisting and suspension operation of hoisting or lowering a lightweight load at a high speed is mainly performed by hoisting or lowering the auxiliary hook 108*b*.

A cab 104*a* serving as an operation cabin is provided at the upper slewing body 104. A variety of operation levers 118 and accelerator 120 (see FIG. 2) operated by the operator are provided inside the cab 104*a*. The operation levers 118 serve to slew the upper slewing body 104, raise or lower the boom 106, hoist or lower the main hook 108*a*, and hoist or lower the auxiliary hook 108*b*.

The crane 100 is also provided with a drive unit controller 122 that performs drive control of the engine 109, slewing control of the upper slewing body 104, and drive control of the winches 112, 114*a*, and 114*b*. Operation signals corresponding to the operation of the operation levers 118 and the accelerator 120 by the operator are inputted to the drive unit controller 122. The operation signal of the accelerator 120 is a signal indicating a fuel injection amount corresponding to the depression degree of the accelerator 120.

The drive unit controller 122 transmits a control signal to a proportional valve 110*a* of the hydraulic mechanism 110 in response to the inputted operation signals of the operation levers 118, thereby controlling the oil pressure supplied by the hydraulic mechanism 110. The slewing operation of the upper slewing body 104 is controlled by controlling the oil pressure supplied by the hydraulic mechanism 110. The drive of the winches 112, 114*a*, and 114*b* are also controlled by controlling the oil pressure, thereby the operation of raising and lowering the boom 106, and the operations of hoisting and lowering the hooks 108*a*, 108*b* are controlled. The operations of slewing the upper slewing body 104, raising and lowering the boom 106, and hoisting and lowering the hooks 108*a*, 108*b* are thus performed correspondingly to the operation of the operation levers 118 by the operator.

The drive unit controller 122 transmits a control signal to the engine 109 in response to the inputted operation signal of the accelerator 120 and thereby performs drive control (revolution speed control) of the engine 109. Data such as the revolution speed of the engine 109 are transmitted from the engine 109 to the drive unit controller 122. Data on the remaining amount of fuel are also transmitted from the below-described fuel gauge 8 to the drive unit controller 122.

Figure 2:
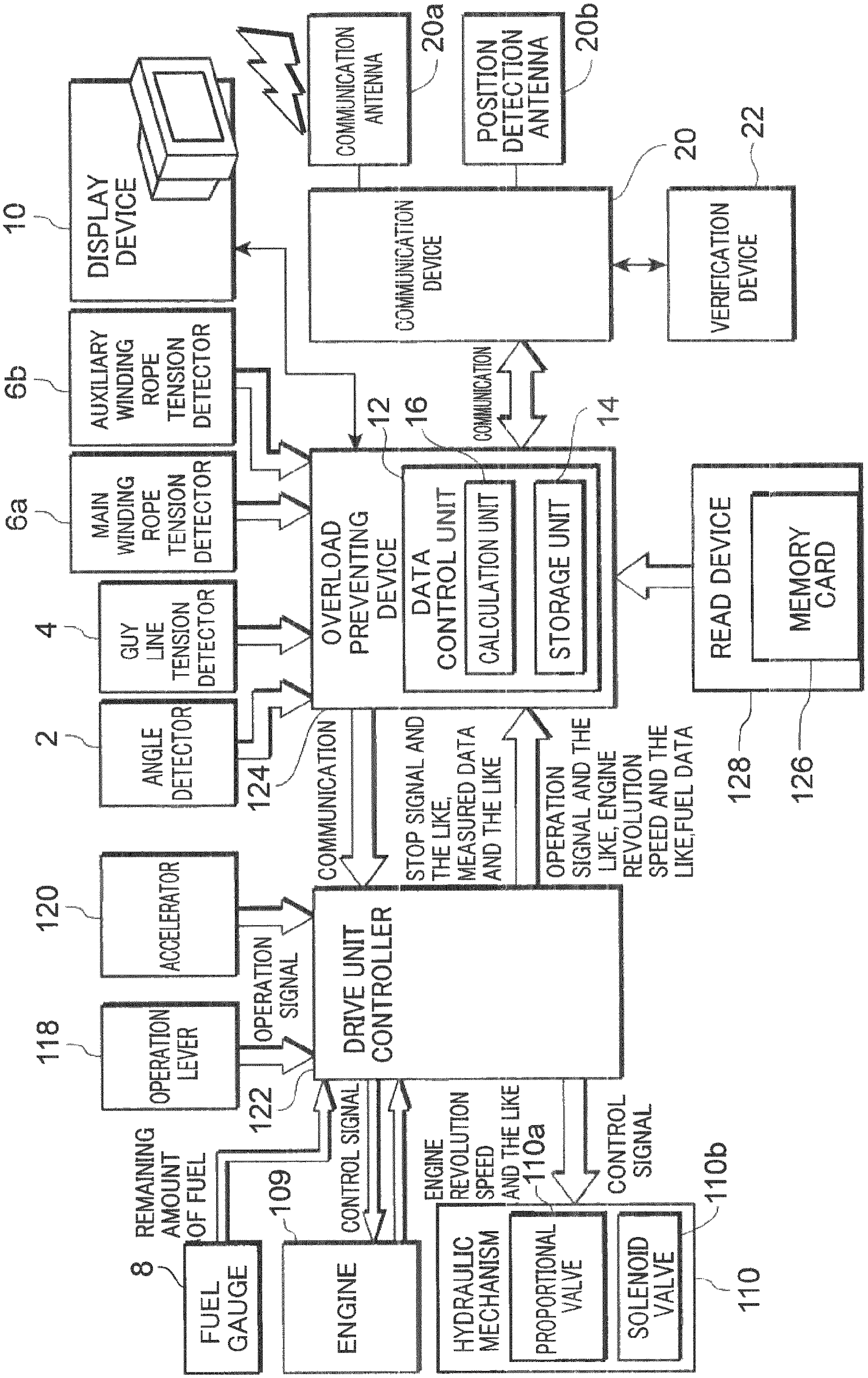
FIG. 2 is a block diagram illustrating the configuration of the crane operation evaluation device and the configuration of the crane control system of one embodiment of the present invention.

The crane 100 is also provided with an overload preventing device 124 (see FIG. 2). The overload preventing device 124 serves to stop or decelerate the operation of the crane 100 when a load equal to or higher than a predetermined load is applied to the boom 106, thereby preventing the overload from being applied to the boom 106. The overload preventing device 124 also has a function of stopping the drive of the winches 112, 114*a*, 114*b* when a boom over-hoisting limit switch (not shown in the figures) is actuated when the boom 106 is raised or when a hook over-hoisting limit switch (not shown in the figure) is actuated when the hooks 108*a*, 108*b* are hoisted, thereby preventing the winches 112, 114*a*, 114*b* from over-hoisting.

More specifically, detection data from an angle detector 2, a guy line tension detector 4, a main hoisting rope tension detector 6*a*, and an auxiliary hoisting rope tension detector 6*b*, which are described below, are inputted to the overload preventing device 124.

The crane 100 is also provided with a read device 128 that reads setting information stored in a memory card 126. The setting information read by the read device 128 is inputted to the overload preventing device 124. The setting information can include setting data representing the configuration of the crane 100, for example the length and weight of the boom 106, data on the weight of hooks 108*a*, 108*b* and the number of turns of the ropes 115*a*, 115*b* relating to the hooks 108*a*, 108*b*, and performance data of the crane 100, for example, a rated load curve that has been set with respect to the total suspended load applied to the boom 106 and the actual load in the suspension operation of the hooks 108*a*, 108*b*.

The overload preventing device 124 determines the rated load in the crane work that is being performed and the actual load applied to the hook 108*a* or 108*b* used in the crane work on the basis of the inputted detection data and the setting information and determines a load ratio of the actual load to the rated load. Where the load ratio reaches a predetermined value, the overload preventing device 124 sends a stop signal to the drive unit controller 114. The drive unit controller 114 receives the stop signal and thereby sends a control signal to the hydraulic mechanism 110, thereby shutting down a solenoid valve 110*b* of the hydraulic mechanism 110, stopping the drive of the winches 112, 114*a*, 114*b*, and stopping the work of the crane 100.

When the load ratio has not yet reached the predetermined value but came close to the predetermined value, the drive unit controller 114 can also perform the control by sending a control signal to the hydraulic mechanism 110, thereby adjusting the opening degree of the proportional valve 110*a* of the hydraulic mechanism 110, reducing the drive speed of the winches 112, 114*a*, 114*b* and reducing the actuation speed of the crane 100.

Further, when the boom over-hoisting limit switch (not shown in the figure) is actuated, the overload preventing device 124 receives a signal outputted from the limit switch and thereby transmits a stop signal to the drive unit controller 114. As a result, the drive unit controller 114 stops the drive of the boom raising-lowering winch 112 in the same manner as described above and thereby prevents the winch from over-hoisting. When the hook over-hoisting limit switch (not shown in the figure) is actuated, the overload preventing device 124 similarly transmits a stop signal to the drive unit controller 114. As a result, the drive unit controller 114 stops the drive of the winches 114*a*, 114*b* in the same manner as described above, thereby preventing the winches from over-hoisting.

The detection data obtained by the detectors, 2, 4, 6*a*, 6*b* are also transmitted from the overload preventing device 124 to the drive unit controller 114. The aforementioned operation signals, data on the revolution speed of the engine 109, and data on the remaining amount of fuel are transmitted from the drive unit controller 114 to the overload preventing device 124.

The operation evaluation device for the crane 100 according to the present embodiment is applied to the crane 100 of the above-described configuration. The operation evaluation device for the crane 100 according to the present embodiment is used to evaluate the status of operation of the crane 100 performed by the operator after the crane 100 has been stopped. The configuration of the operation evaluation device will be described below.

The operation evaluation device for the crane 100 according to the present embodiment has the angle detector 2, the guy line tension detector 4, the main hoisting rope tension detector 6*a*, the auxiliary hoisting rope tension detector 6*b*, the fuel gauge 8, a display device 10, and a data control unit 12.

The angle detector 2 detects the elevation angle (referred to hereinbelow as "boom angle") of the boom 106 with respect to a horizontal plane. The guy line tension detector 4 detects the tension of the guy line 106*b*. The main hoisting rope tension detector 6*a* detects the tension of the main hoisting rope 115*a*. The auxiliary hoisting rope tension detector 6*b* detects the tension of the auxiliary hoisting rope 115*b*. The fuel gauge 8 detects the remaining amount of fuel in a fuel tank (not shown in the figure). These angle detector 2, guy line tension detector 4, main hoisting rope tension detector 6*a*, auxiliary hoisting rope tension detector 6*b*, and fuel gauge 8 are included in the general concept of "detectors" in accordance with the present invention.

The display device 10 displays predetermined data on a screen and is provided at a position inside the cab 104*a* such as to be visible to the operator.

The data control unit 12 derives a first fuel consumption index and a first work index on the basis of detection data of the aforementioned detectors 2, 4, 6*a*, 6*b* and detection data of the fuel gauge 8 and also the setting information that has been read from the memory card 126 after a stopping operation of the engine 109 performed by the operator and displays the derived first fuel consumption index and first work index on the display device 10. The first fuel consumption index serves to analyze the fuel consumption efficiency of the crane work performed after the most recent start of the engine 109 and before the engine 109 is stopped by the present stopping operation, and the first work index serves to analyze the contents of the crane work performed after the most recent start of the engine 109 and before the engine 109 is stopped by the present stopping operation. The data control unit 12 also derives a second fuel consumption index and a second work index after a stopping operation of the engine 109 performed by the operator and displays the derived second fuel consumption index and second work index on the display device 10. The second fuel consumption index serves to analyze the fuel consumption efficiency of the crane work performed after the very first start of the engine 109 in the day in which the engine 109 has been run and before the engine 109 is stopped by the present stopping operation, and the second work index serves to analyze the contents of the crane work performed after the very first start of the engine 109 in the day in which the engine 109 has been run and before the engine 109 is stopped by the present stopping operation. Where the stopping operation of the engine 109 is performed by the operator, the data control unit 12 automatically derives the first and second fuel consumption indexes and the first and second work indexes and displays these indexes on the display device 10.

More specifically, the data control unit 12 is incorporated in the overload preventing device 124. In other works, the control unit of the overload preventing device 124 is provided with functions of the data control unit 12 of the operation evaluation device of the present embodiment. Therefore, the detection data of the aforementioned detectors 2, 4, 6*a*, 6*b*, data on the operation signals, data on the revolution speed of the engine 109, data on the remaining amount of fuel detected by the fuel gauge 8, and setting information read out from the memory card 126 that are inputted in the overload preventing device 124 are also inputted in the data control unit 12.

The data control unit 12 has a storage unit 14 and a calculation unit 16.

The storage unit 14 stores various data. The storage unit 14 stores the aforementioned data and setting information inputted to the data control unit 12 and the first fuel consumption index, first work index, second fuel consumption index, and second work index calculated in the below-described manner by the calculation unit 16.

The calculation unit 16 calculates the first and second fuel consumption indexes and the first and second work indexes on the basis of the detection data of the detectors 2, 4, 6*a*, 6*b* and the detection data of the fuel gauge 8.

The first fuel consumption index includes a fuel amount consumed by present running of the engine 109, that is, present running of the crane 100 (referred to hereinbelow as “present fuel consumption amount”), a fuel amount consumed for one suspension work in the present running of the crane 100 (referred to hereinbelow as “present fuel consumption amount per one suspension work”), and a fuel amount consumed for unit interval of moment-time in the present running of the crane 100 (referred to hereinbelow as “present fuel consumption amount per moment-time”). The present running of the engine 109 as referred to herein means the running of the engine 109 after the most recent start of the engine 109 and before the engine 109 is stopped by the present stopping operation performed by the operator.

The calculation unit 16 finds the remaining amount of fuel at the time of the most recent start of the engine 109 and the remaining amount of fuel at the time of the present stopping of the engine 109 on the basis of detection data of the fuel gauge 8 and calculates the present fuel consumption amount from the difference between the remaining amounts of fuel. Then, the calculation unit 16 calculates the present fuel consumption amount per one suspension work by dividing the calculated present fuel consumption amount by the number of suspension works performed during the present running of the crane 100. The number of suspension works can be counted by a system according to which one suspension work is counted when one operation of hoisting and lowering the hook 108*a* or 108*b* is performed and also by a system according to which one suspension work is counted when a raising-lowering operation of the boom 106 or a slewing operation of the upper slewing body 104 is performed during one operation of hoisting and lowering the hooks. In this way, any system may be used for counting the number of suspension works used in the present embodiment. The calculation unit 16 counts the hoisting and lowering operations of the hooks 108*a*, 108*b*, raising-lowering operations of the boom 106, and slewing operations of the upper slewing body 104 on the basis of operation signals of respective operation levers 118.

The calculation unit 16 calculates the present fuel consumption amount per moment-time by dividing the calculated present fuel consumption amount by the accumulated total moment-time in the present running of the crane 100. Further, the calculation unit 16 calculates a work radius of the crane 100 on the basis of the boom angle detected by the angle detector 2 and the length of the boom 106 taken from the setting data. The calculation unit 16 determines a total load of a suspended cargo and the hook 108*a* (108*b*) on the basis of tension detected by the rope tension detector 6*a* (6*b*) and calculates a suspended load by subtracting the weight of the hook 108*a* (108*b*) taken from the setting data from the determined total load. Then, the calculation unit 16 calculates a moment by multiplying the calculated work radius by the suspended load and calculates the moment-time by multiplying the calculated moment by the corresponding work time.

The first work index also includes the number of suspension works performed per one-hour of running time in the present running of the crane 100 (referred to hereinbelow as “present number of suspension works per unit time”) and a value of moment-time in the present running of the crane 100 (crane wok) per one-hour of the running time (unit work time) of the crane 100 (this value will be referred to hereinbelow as “present unit moment-time”).

The calculation unit 16 determines the present running time of the crane 100 on the basis of the timing of the most recent start of the engine 109 and the timing of the present stop and calculates the present number of suspension works per unit time by dividing the number of suspension works performed in the present running of the crane 100 by the present running time of the crane 100. Then, the calculation unit 16 calculates the present unit moment-time by dividing the accumulated total moment-time in the present running of the crane 100 by the present running time (work time) of the crane 100.

The second fuel consumption index includes an accumulated total fuel consumption amount in operation in present one day in which the crane 100 has been run (referred to hereinbelow as “accumulated total fuel consumption amount in operation in present one day”), a fuel amount consumed for one suspension work in operation in present one day in which the crane 100 has been run (referred to hereinbelow as “fuel consumption amount per one suspension work in present one day”), and a fuel amount consumed per unit time of the moment-time in operation in present one day in which the crane 100 has been run (referred to hereinbelow as “fuel consumption amount per moment-time in operation in present one day”). Each index included in the second fuel consumption index is obtained by summing up the corresponding data in each of running cycles when the crane 100 is run a plurality of times in one day, but is equal to the index of a single running at a point of time in which the crane 100 has been run once in one day. The same is true for the below-described second fuel consumption index and second work index.

The calculation unit 16 calculates the accumulated total fuel consumption amount in operation in present one day by integrating the fuel amounts consumed by all of the running cycles of the crane 100 when the crane 100 has been run a plurality of times in operation in present one day in which the crane 100 has been run. The calculation unit 16 determines the number of suspension works performed in this one day by integrating the number of suspension works performed in all of the running cycles of the crane 100 when the crane 100 has been run a plurality of times in operation in present one day in which the crane 100 has been run and calculates the fuel consumption amount per one suspension work in present one day by dividing the accumulated total fuel consumption amount in operation in present one day by the determined number of suspension works. The calculation unit 16 also calculates the moment-time of operation in present one day in which the crane 100 has been run and calculates the fuel consumption amount per moment-time in operation in present one day by dividing the accumulated total fuel consumption amount in present one day by the moment-time of operation in present one day.

The second fuel consumption index also includes a revolution speed distribution of the engine 109 in a period after the very first start of the engine 109 and before the engine 109 is stopped by the present stopping operation in present one day in which the engine 109 has been run (referred to hereinbelow as “engine revolution speed distribution in operation in present one day”), a revolution speed distribution of the engine 109 when the hooks 108*a*, 108*b* are hoisted in operation in present one day in which the engine 109 has been run (referred to hereinbelow as “engine revolution speed distribution during hoisting”), and a revolution speed distribution of the engine 109 when the hooks 108*a*, 108*b* are lowered in operation in present one day in which the engine 109 has been run (referred to hereinbelow as “engine revolution speed distribution during lowering”).

The calculation unit 16 divides the revolution speed of the engine 109 into a plurality of revolution speed ranges. Then, the calculation unit 16 determines the engine revolution speed distribution in operation in present one day by counting the number of minutes in a time interval corresponding to each revolution speed range from the transition data of the revolution speed of the engine 109 in this day. Further, the calculation unit 16 determines the hoisting time and lowering time of the hooks 108*a*, 108*b* on the basis of operation signals of the operation lever 118, extracts a portion corresponding to the hoisting time from the engine revolution speed distribution in operation in present one day to find an engine revolution speed distribution during hoisting, and extracts a portion corresponding to the lowering time from the engine revolution speed distribution in operation in present one day to find an engine revolution speed distribution during the lowering operation.

The second work index also includes the number of suspension works performed per one-hour running of the crane 100 in operation in present one day in which the crane 100 has been run (referred to hereinbelow as "number of suspension works per unit time in operation in present one day") and a value of moment-time in operation in present one day in which the crane 100 has been run per one-hour of the running time (unit work time) of the crane 100 (this value will be referred to hereinbelow as "unit moment-time in operation in present one day").

The calculation unit 16 determines an accumulated total running time of the crane 100 in operation in present one day by integrating the running time of the crane 100 in each cycle performed in operation in present one day in which the crane 100 has been run (running time of the engine 109), and calculates the number of suspension works per unit time in operation in present one day by dividing the number of suspension works performed in operation in present one day in which the crane 100 has been run by the determined accumulated total running time. The calculation unit 16 also calculates a unit moment-time in operation in present one day by dividing the integrated value of the moment-time in operation in present one day in which the crane 100 has been run by the accumulated total running time of the crane 100 in operation in present one day.

The second work index also includes a moment-time in operation in present one day in which the crane 100 has been run (referred to hereinbelow as "moment-time in operation in present one day"), a number of suspension works performed in operation in present one day in which the crane 100 has been run (referred to hereinbelow as "accumulated total number of suspension works in present one day), a number of operations of the operation lever 118 in operation in present one day in which the crane 100 has been run (referred to hereinbelow as "accumulated total number of operations in present one day"), an operation time of the operation lever 118 in operation in present one day in which the crane 100 has been run (referred to hereinbelow as "accumulated total operation time in operation in present one day"), and a ratio of the accumulated total operation time in operation in present one day to the accumulated total running time of the crane 100 in operation in present one day (referred to hereinbelow as "operation time ratio in operation in present one day").

The calculation unit 16 then determines the accumulated total number of operations in present one day by integrating the number of operations of the operation lever 118 performed in operation in present one day in which the crane 100 has been run on the basis of the operation signals of the operation lever 118. The calculation unit 16 then determines the accumulated total operation time in operation in present one day by integrating the operation time of the operation lever 118 in operation in present one day in which the crane 100 has been run on the basis of the operation signals of the operation lever 118. Then, the calculation unit 16 determines the operation time ratio in operation in present one day by dividing the determined accumulated total operation time in operation in present one day by the accumulated total running time of the crane 100 in operation in present one day.

The second work index also includes a distribution of operation intervals of the operation lever 118 in operation in present one day in which the crane 100 has been run (referred to hereinbelow as "operation interval distribution in operation in present one day") and a correlated distribution of work radius of the crane 100 and actual load acting on the crane 100 in operation in present one day in which the crane 100 has been run (referred to hereinbelow as "correlated distribution of work radius and actual load in crane work in present one day").

The calculation unit 16 determines an operation interval distribution in operation in present one day by counting the number of seconds taken by an operation interval of the operation lever 118 in operation in present one day in which the crane 100 has been run, that is, by a time interval from the point of time in which the operation lever 118 is operated and the operation signal thereof is inputted till the point of time in which the operation lever 118 is operated again and the operation signal thereof is inputted, for each of a plurality of divided time ranges. The calculation unit 16 also determines a correlated distribution of the work radius and actual load in the crane work of present one day by dividing a work radius in the crane work in present one day in which the crane 100 has been run into a plurality of predetermined ranges, and counting the number of minutes taken by the crane work in each range of the work radius, then dividing the actual load in the crane work in this one day into a plurality of load ranges, and counting the number of minutes taken by the crane work in each load range.

Further, the second work index includes a safety index for analyzing the degree of safety of crane works performed after the very first start of the engine 109 in operation in present one day in which the engine 109 has been run and before the stop of the engine 109 by the present stopping operation performed by the operator. More specifically, the safety index includes the number of times that the overload preventing device 124 has determined the occurrence of overload and the operation of the crane 100 has been stopped within present one day in which the crane 100 has been run (referred to hereinbelow as "number of overload occurrences in present one day") and the number of times that the overload preventing device 124 has detected the over-hoisting of the winches 112, 114*a*, 114*b* and the operation of these winches 112, 114*a*, 114*b* has been stopped in operation in present one day in which the crane 100 has been run (referred to hereinbelow as "number of over-hoisting occurrences in present one day").

The calculation unit 16 determines the number of overload occurrences in present one day by counting the number of times that the operation of the crane 100 has been stopped by the overload preventing device 124 in operation in present one day in which the engine 109 has been run and also determines the number of over-hoisting occurrences in present one day by counting the number of times that the operation of the winches 112, 114*a*, 114*b* has been stopped by the overload preventing device 124 in operation in present one day in which the engine 109 has been run.

A communication device 20 is provided at the crane 100 so as to enable mutual communication with the data control unit 12. The communication device 20 serves to transmit to the outside the second fuel consumption index and the second work index that have been derived in the above-described manner by the calculation unit 16 and recorded in the recording unit 14 and also to receive various data from the outside. The communication device 20 is provided with a communication antenna 20*a* for transmitting and receiving the each data and a position detecting antenna 20*b* that can be GPS (Global Positioning System) positioned and is used for measuring the position of the crane 100. Data recorded in the recording unit 14 are transmitted from the data control unit 12 to the communication device 20 responding to that the crane 109 is stopped. When the data are transmitted to the communication device 20 after the engine 109 has been stopped, the connection between the data control unit 12 and the power source and the connection between the drive unit controller 122 and the power source are cut off. However, since the communication device 20 is required to transmit and receive data even after the power source of the crane 100 is OFF, the communication device is connected to the power source at all times. Therefore, the transmission of data from the communication device 20 to the outside is performed not only immediately after the engine 109 has been stopped, but also continuously thereafter. Further, the communication device 20 also successively transmits data relating to each period from one start to one stop of the engine 109 for each such period. The communication device 20 can also accumulate the data relating to a plurality of periods from start to stop of the engine 109 and transmit together the data relating to this plurality of periods once a day.

The crane 100 is also provided with a verification device 22. The verification device 22 can perform data communication with the communication device 200. The verification device 22 serves to verify, before the engine 109 is started, that the operator who will operate the crane 100 has been registered in advance. A database of ID (Identification Data) of operators who are allowed to operate the crane 100 has been recorded in advance in the below-described database server 27. Prior to starting the engine 109, the operator sets an individual ID card in the verification device 22, and the verification device 22 compares the individual ID with the database of ID that has been read from the database server 27 via the communication device 20 and performs verification. In this case, when the individual ID of the operator does not match the registered ID, the engine 109 is not allowed to be started. The individual information including the ID of the operator that has been read from the individual ID card by the verification device 22 is sent to the data control unit 12 via the communication device 20. The individual information sent to the data control unit 12 is associated with the data on the fuel consumption indexes and the work indexes derived by the calculation unit 16 and recorded in the recording unit 14.

FIGS. 4 to 12 illustrate the contents of each screen displayed on the display device 10 after the stopping operation of the engine 109 has been performed by the operator. As shown in FIGS. 4 to 12, the data control unit 12 displays on the display device 10 the data on the first and second fuel consumption indexes and the first and second work indexes calculated by the calculation unit 16 in the above-described manner, after the stopping operation of the engine 109 has been performed by the operator. The contents of each screen displayed on the display device 10 will be explained below.

Figure 4:
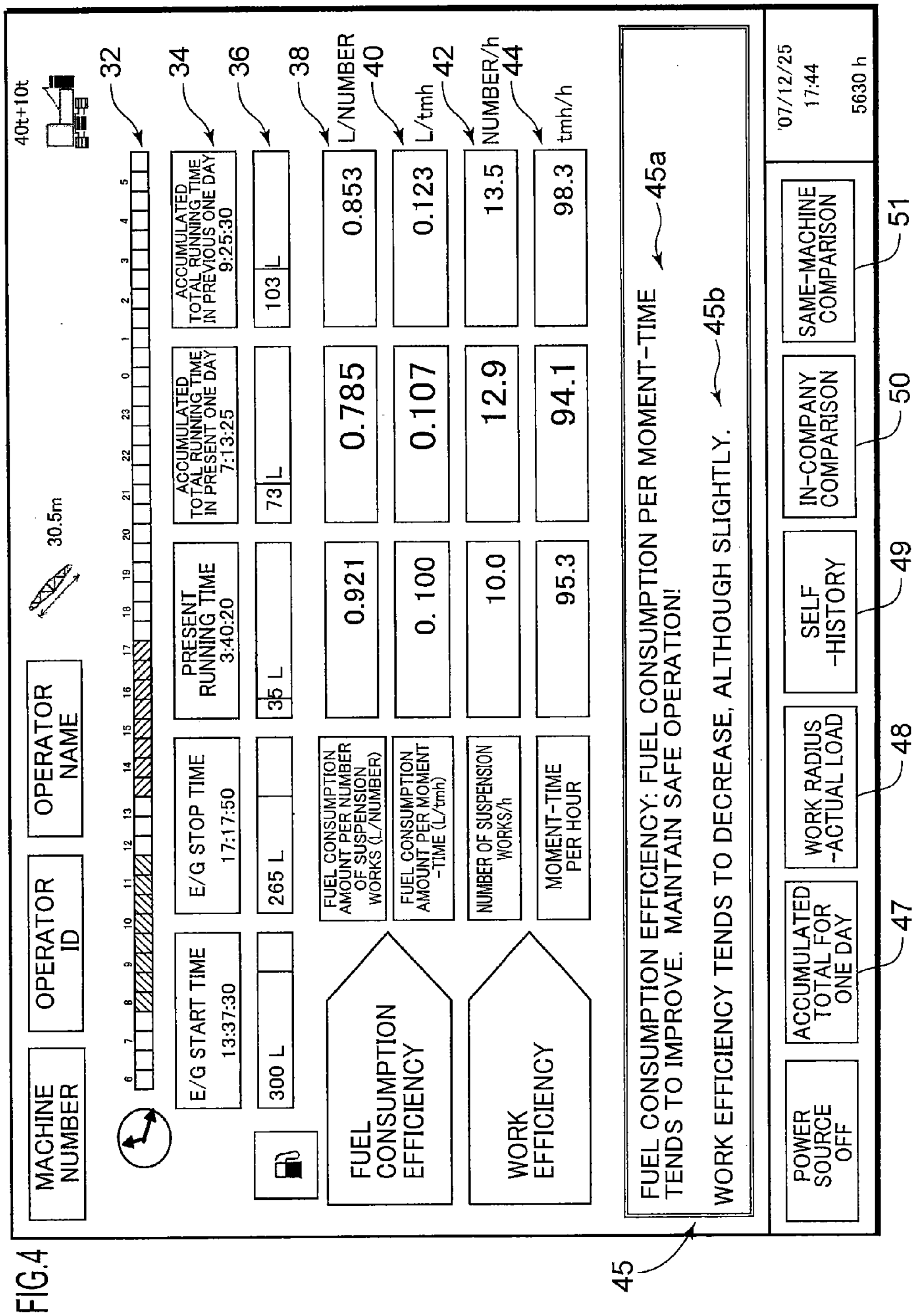
FIG. 4 illustrates the display contents of the efficiency evaluation screen displayed on the display device of the operation evaluation device.

The screen shown in FIG. 4 is an efficiency evaluation screen and shows evaluation of fuel consumption efficiency and work efficiency of crane work. The efficiency evaluation screen is the first screen to be displayed on the display device 10 after the stopping operation has been performed.

In the efficiency evaluation screen, the machine number of crane 100, operator ID, operator name, length of the boom 106, and state of a counterweight 104*b* mounted on the upper slewing body 104 are displayed from left to right in the order of description in the uppermost portion of the screen. A running time zone display section 32 is provided below the above-mentioned displayed items, and running time zones of the crane 100 in operation in present one day in which the crane 100 has been run are shown in the running time zone display section 32.

Further, an engine running time display row 34 is provided as a lower row. The present start time of the engine 109, present stop time of the engine 109, present running time of the engine 109, accumulated total running time of the engine 109 in operation in present one day in which the engine 109 has been run, and an accumulated total running time of the engine 109 in the previous one day in which the engine 109 has been run are displayed from left to right in the order of description in the engine running time display row 34.

A fuel amount display row 36 is provided in still lower row. The remaining amount of fuel at the present start time of the engine 109, remaining amount of fuel at the present stop time of the engine 109, present fuel consumption amount, accumulated total fuel consumption amount in operation in present one day, and accumulated total fuel consumption amount in the previous one day in which the crane 100 has been run are displayed from left to right in the order of description in the fuel amount display row 36. The previous one day in which the crane 100 has been run, as referred to herein, means the most recent day in which the crane 100 has been run before the present day in which the crane 100 has been run and the meaning thereof is the same in the explanation below.

A display row 38 of fuel consumption amount per one suspension work is provided below the fuel amount display row 36. The present fuel consumption amount per one suspension work, fuel consumption amount per one suspension work in present one day, and the amount of fuel consumed for one suspension work in the previous one day in which the crane 100 has been run (referred to hereinbelow as "fuel consumption per one suspension work in the previous one day") are displayed from left to right in the order of description in the display row 38.

A display row 40 of fuel consumption amount per moment-time is provided below the display row 38 of fuel consumption amount per one suspension work. The present fuel consumption amount per moment-time, fuel consumption amount per moment-time in operation in present one day, and fuel consumption amount per unit time of moment-time in the previous one day in which the crane 100 has been run (referred to hereinbelow as "fuel consumption per moment-time in the previous one day") are displayed from left to right in the order of description in the display row 40.

A display row 42 of the number of suspension works per unit time is provided below the display row 40 of fuel consumption amount per moment-time. The number of suspension works per unit time at present, number of suspension works per unit time in operation in present one day, and number of suspension works per one-hour operation of the crane 100 in the previous one day in which the crane 100 has been run (referred to hereinbelow as "number of suspension works per unit time in the previous one day") are displayed from left to right in the order of description in the display row 42.

A unit moment-time display row 44 is provided below the display row 42 of the number of suspension works per unit time. The present unit moment-time, unit moment-time in operation in present one day, and a value of the unit moment-time per one-hour of running time of the crane 100 (unit work time) in the previous one day in which the crane 100 has been run (referred to hereinbelow as "unit moment-time in operation in the previous one day") are displayed from left to right in the order of description in the display row 44.

An evaluation message display row 45 is provided below the above-described displays. A message 45*a* displaying the evaluation of fuel consumption efficiency of the crane work and a message 45*b* displaying the evaluation of work efficiency of the crane work are provided in the evaluation message display row 45. The message 45*a* displaying the evaluation of fuel consumption efficiency is derived from the results obtained by comparing the fuel consumption amount per one suspension work in present one day and the fuel consumption amount per one suspension work in the previous one day and comparing the fuel consumption amount per moment-time in operation in present one day and the fuel consumption amount per moment-time in the previous one day. The message 45*b* displaying the evaluation of work efficiency is derived from the results obtained by comparing the number of suspension works per unit time in operation in present one day and the number of suspension works per unit time in the previous one day and comparing the unit moment-time in operation in present one day and the unit moment-time in the previous one day.

Figure 5:
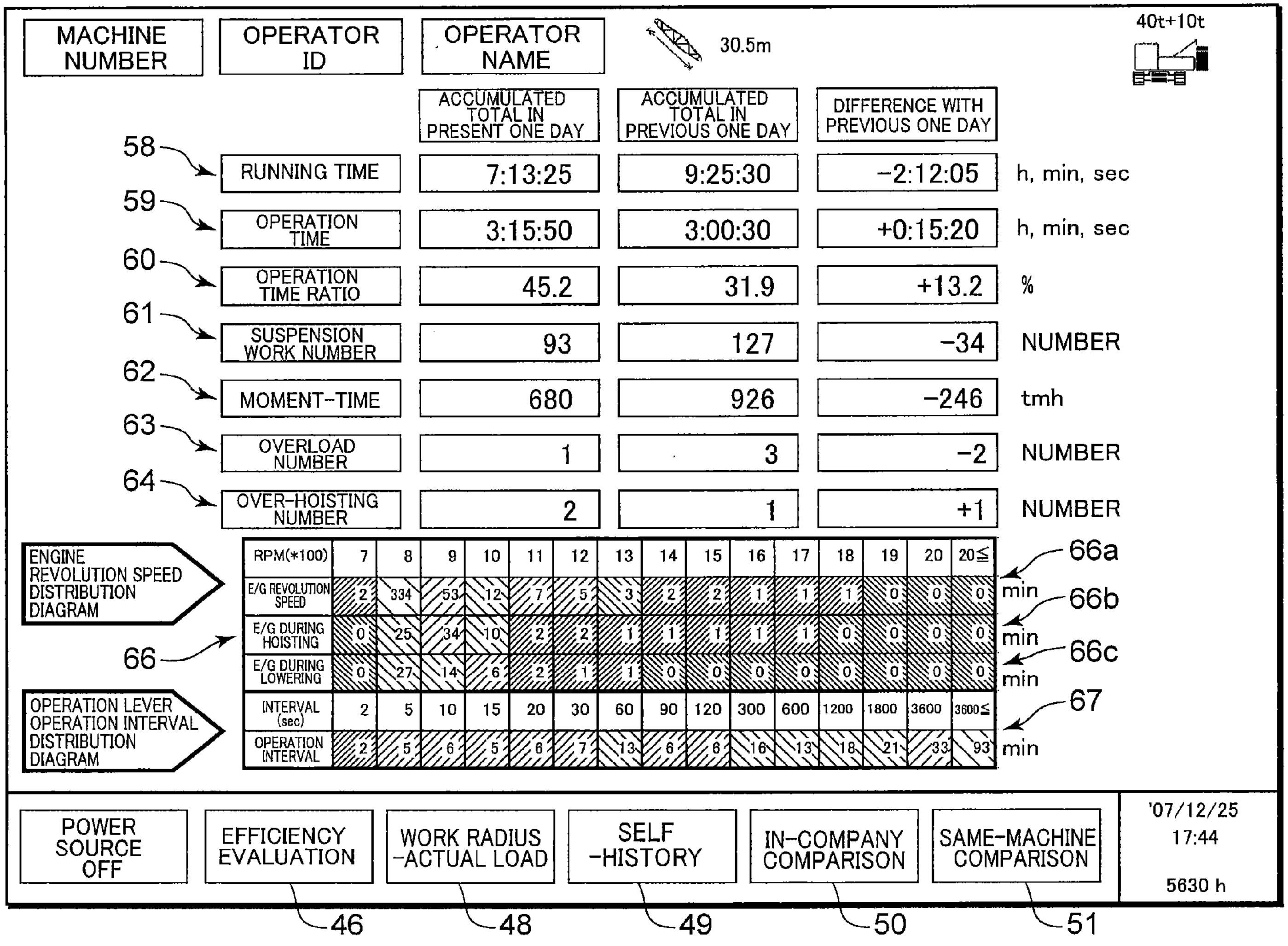
FIG. 5 illustrates the display contents of the one-day accumulated data screen displayed on the display device of the operation evaluation device.

The screen shown in FIG. 5 is a one-day accumulation total data screen that displays accumulated total data of each index in operation in present one day in which the crane 100 has been run. The display contents of the uppermost portion of this screen are identical to those of the aforementioned efficiency evaluation screen. A running dime display row 58, an operation time display row 59, an operation time ratio display row 60, a suspension work number display row 61, a moment-time display row 62, an overload number display row 63, and an over-hoisting number display row 64 are provided from top to bottom in the order of description in the underside portion of the uppermost portion of the screen.

The accumulated total running time in operation in present one day in which the crane 100 has been run, accumulated total running time in the previous one day in which the crane 100 has been run, and a value representing a difference between the accumulated total running time in operation in present one day and the accumulated total running time in the previous one day (a value obtained by subtracting the accumulated total running time in the previous one day from the accumulated total running time in operation in present one day) are displayed from left to right in the order of description in the running time display row 58.

The accumulated total operation time in operation in present one day, accumulated total operation time of the operation lever 118 in the previous one day in which the crane 100 has been run, and a value representing a difference between the accumulated total operation time in operation in present one day and the accumulated total operation time in the previous one day (a value obtained by subtracting the accumulated total operation time in the previous one day from the accumulated total operation time in operation in present one day) are displayed from left to right in the order of description in the operation time display row 59.

The operation time ratio in operation in present one day, operation time ratio in the previous one day in which the crane 100 has been run, and a value representing a difference between the operation time ratio in operation in present one day and the operation time ratio in the previous one day (a value obtained by subtracting the operation time ratio in the previous one day from the operation time ratio in operation in present one day) are displayed from left to right in the order of description in the operation time ratio display row 60.

The accumulated total number of suspension works in present one day, accumulated total number of suspension works performed in the previous one day in which the crane 100 has been run, and a value representing a difference between the accumulated total number of suspension works in present one day and the accumulated total number of suspension works in the previous one day (a value obtained by subtracting the accumulated total number of suspension works in the previous one day from the accumulated total number of suspension works in operation in present one day) are displayed from left to right in the order of description in the suspension work number display row 61.

The moment-time in operation in present one day, accumulated total of moment-time in the previous one day in which the crane 100 has been run, and a value representing a difference between the moment-time in operation in present one day and the moment-time in the previous one day (a value obtained by subtracting the moment-time in the previous one day from the moment-time in operation in present one day) are displayed from left to right in the order of description in the moment-time display row 62.

The number of overload occurrences in operation in present one day, number of overload occurrences in the previous one day in which the crane 100 has been run, and a value representing a difference between the number of overload occurrences in present one day and the number of overload occurrences in the previous one day (a value obtained by subtracting the number of overload occurrences in the previous one day from the number of overload occurrences in present one day) are displayed from left to right in the order of description in the overload number display row 63.

The number of over-hoisting occurrences in present one day, number of over-hoisting occurrences in the previous one day in which the crane 100 has been run, and a value representing a difference between the number of over-hoisting occurrences in present one day and the number of over-hoisting occurrences in the previous one day (a value obtained by subtracting the number of over-hoisting occurrences in the previous one day from the number of over-hoisting occurrences in present one day) are displayed from left to right in the order of description in the over-hoisting number display 64.

A revolution speed distribution diagram 66 of the engine 109 is displayed further below the display rows 58 to 64. A display row 66*a* of engine revolution speed distribution in operation in present one day, a display row 66*b* of engine revolution speed distribution during hoisting, and a display row 66*c* of engine revolution speed distribution during lowering are provided from top to bottom in the order of description in the revolution speed distribution diagram 66. In the present embodiment, in the display rows 66*a* to 66*c* of revolution speed distribution, the revolution speed range from 700 RPM to 2000 RPM is divided into boxes for each 100 RPM that are arranged sequentially from left to right, and the entire revolution speed range (2000 RPM or higher) is displayed in one box on the rightmost side. An accumulated total of time intervals during which the revolution speed of the engine 109 is within the respective divided revolution speed range is indicated by a numerical value in each box, and the size of the numerical values can be visualized for example by coloring the boxes.

An operation interval distribution diagram 67 of the operation lever 118 is displayed below the revolution speed distribution diagram 66. The operation interval distribution diagram 67 displays the operation interval distribution in operation in present one day. In the present embodiment, in the operation interval distribution diagram 67, the range of operation intervals from 2 sec to 3600 sec is divided into 14 boxes for each predetermined range and arranged sequentially from left to right, wherein the accumulated total time corresponding to the operation intervals of equal to or longer than 3600 is displayed in one box on the rightmost side. An accumulated total of time intervals during which the operation interval of the operation lever 118 is within the respective operation interval range is indicated by a numerical value in each box, and the size of the numerical values can be visualized for example by coloring the boxes.

Figure 6:
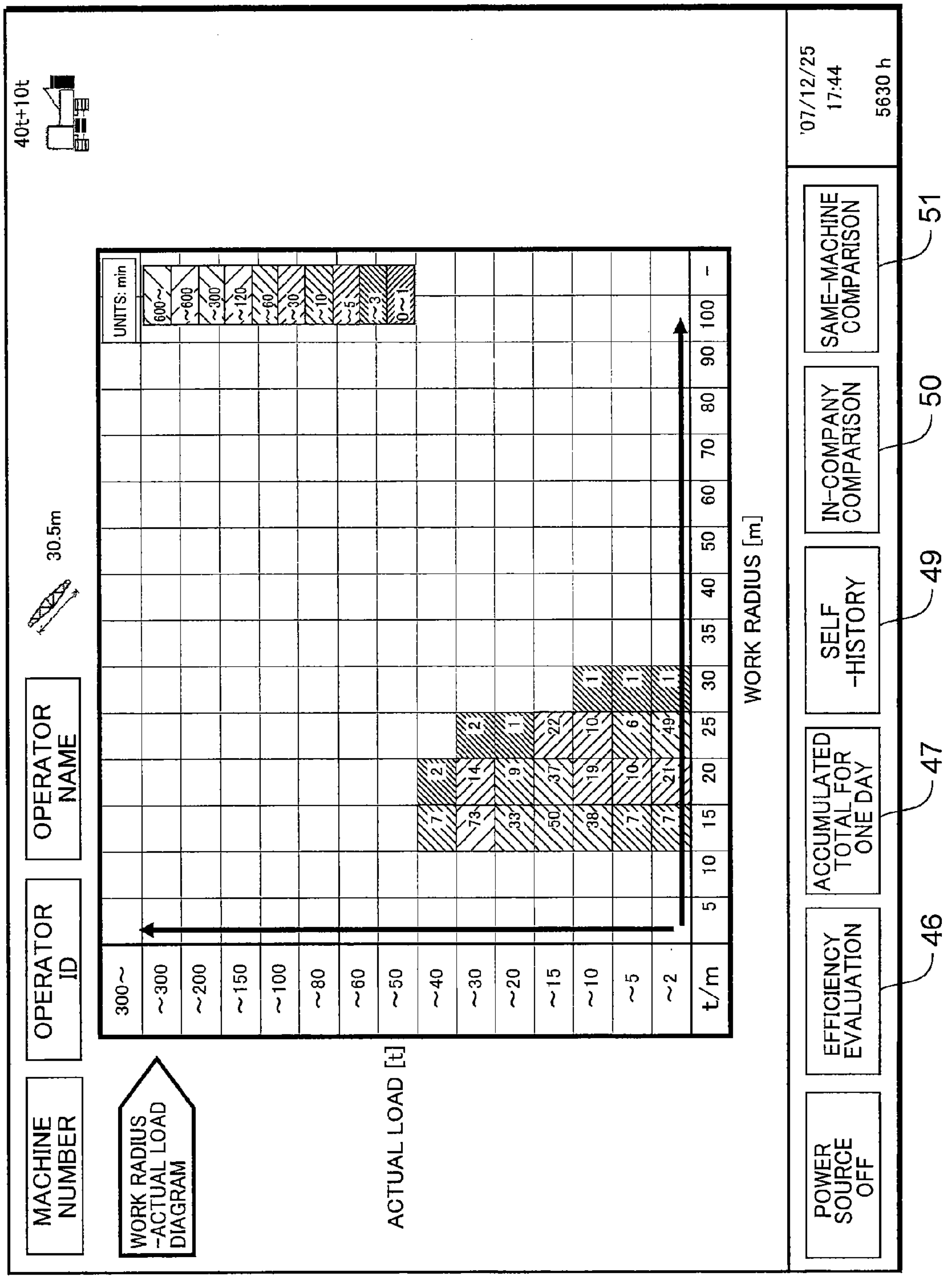
FIG. 6 illustrates the display contents of the work radius-actual load distribution screen displayed on the display device of the operation evaluation device.

The screen shown in FIG. 6 is a work radius-actual load distribution screen. This screen displays a correlated distribution of work radius and actual load in the crane work of present one day that indicates at which work radius and under which actual load the suspension works have been performed in operation in present one day in which the crane 100 has been run.

In the work radius-actual load distribution diagram, the work radius is plotted against the abscissa and the actual load is plotted against the ordinate, and the ranges of axes are divided into a plurality of boxes. An accumulated total time of performing the crane work with a work radius corresponding to each of a plurality of ranges obtained by dividing the entire range of work radius and an accumulated total time of performing a crane work with an actual load corresponding to each of a plurality of ranges obtained by dividing the entire range of actual load are displayed by numerical values in respective boxes. In this distribution diagram, the size of the accumulated total time can be visualized by coloring the boxes. In the present embodiment, the size of accumulated total time is color displayed in a total of ten grades: nine grades for each divided predetermined range of the accumulated total time from 0 min to 600 min and one grade for an accumulated total time equal to or longer than 600 min.

Figure 8:
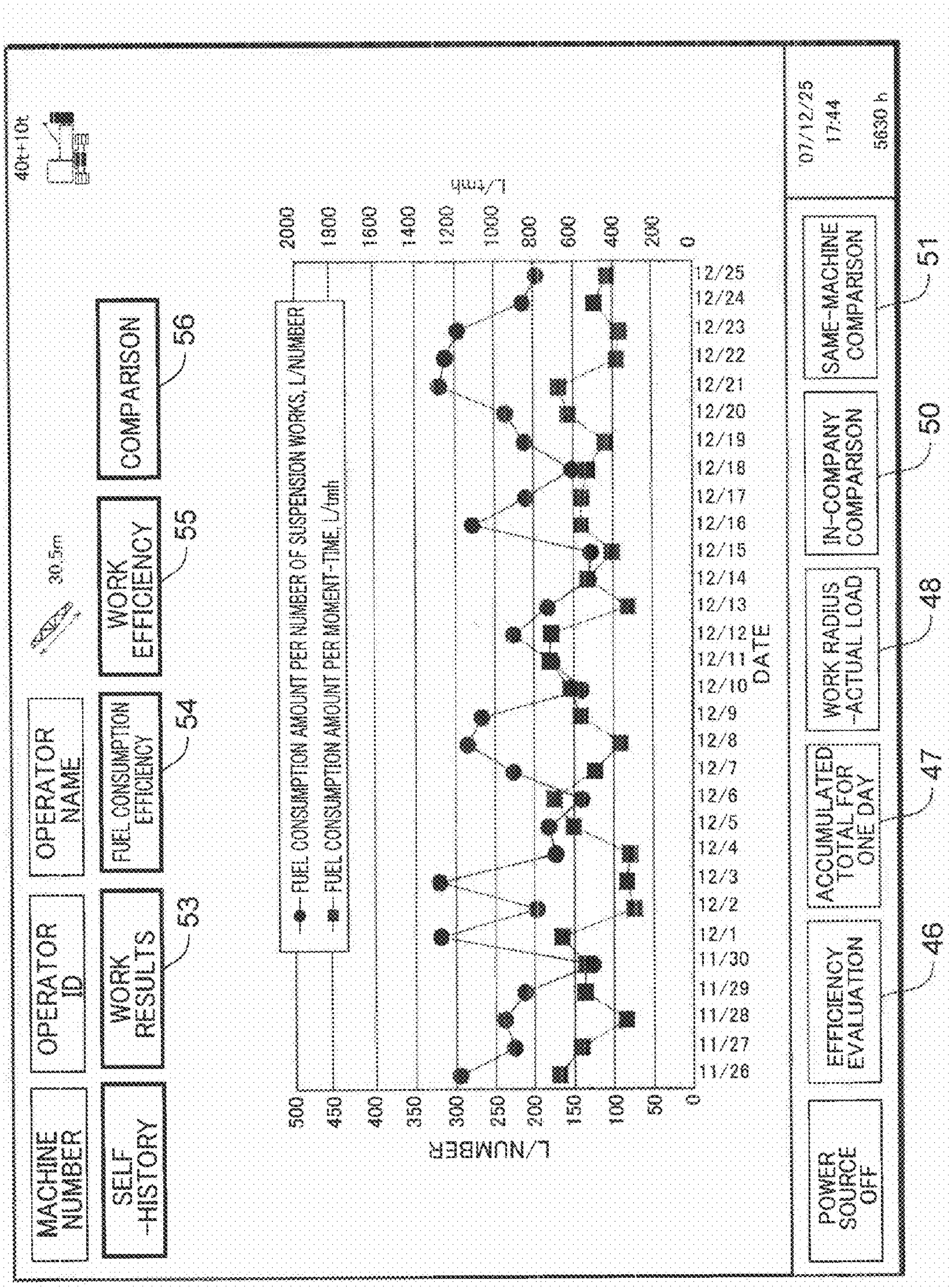
FIG. 8 shows a screen displaying the fuel consumption efficiency in the self-history displayed on the display device of the operation evaluation device.
Figure 9:
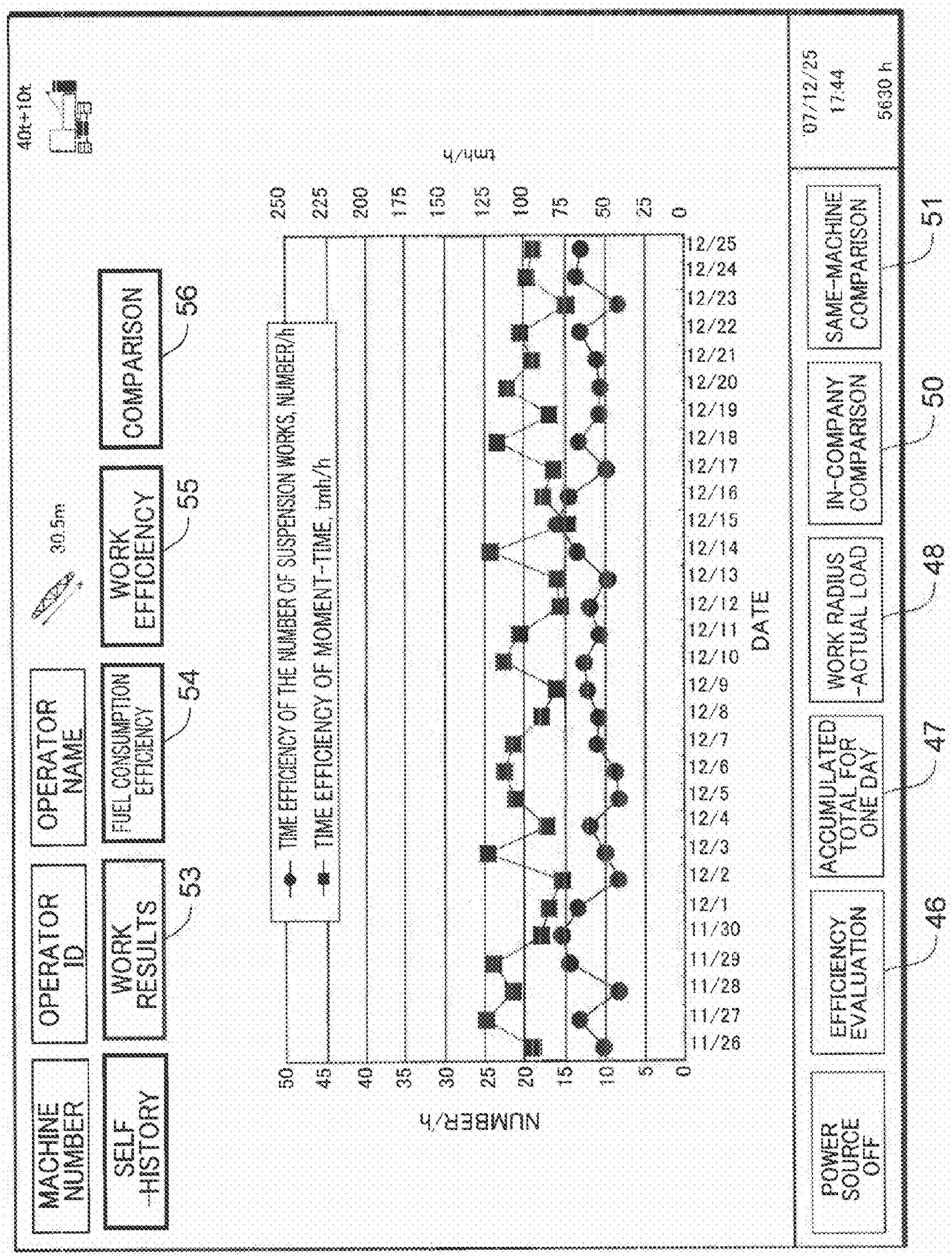
FIG. 9 shows a screen displaying the work efficiency in the self-history displayed on the display device of the operation evaluation device.
Figure 10:
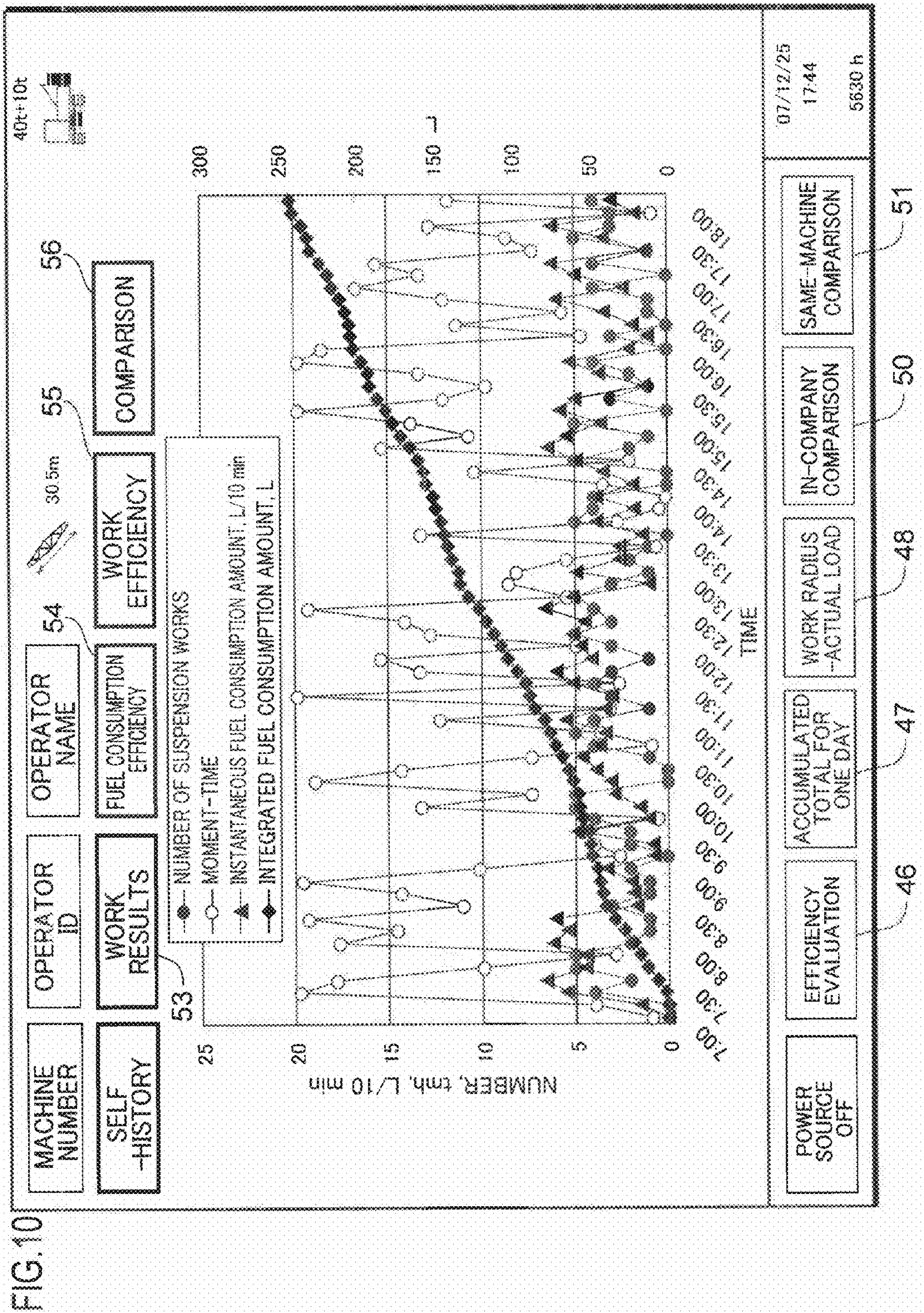
FIG. 10 shows a screen that comparatively displays the indexes in the self-history displayed on the display device of the operation evaluation device.

Screens shown in FIGS. 7 to 10 are self-history screens that display, as trend graphs, the history of fuel consumption indexes and work indexes for the operator authenticated by the verification device 22. Among these self-history screens, FIG. 7 displays work results in self-history, FIG. 8 displays fuel consumption efficiency in self-history, FIG. 9 displays work efficiency in self-history, and FIG. 10 is a comparative display of indexes in self-history. These screen displays of self-history are obtained by transmitting data on self-history saved in the below-described database server 27 to the data control unit 12 via the communication device 20 on the basis of information on the operator authenticated by the verification device 22 and displaying the data on self-history with the data control unit 12 on the display device 10.

Figure 7:
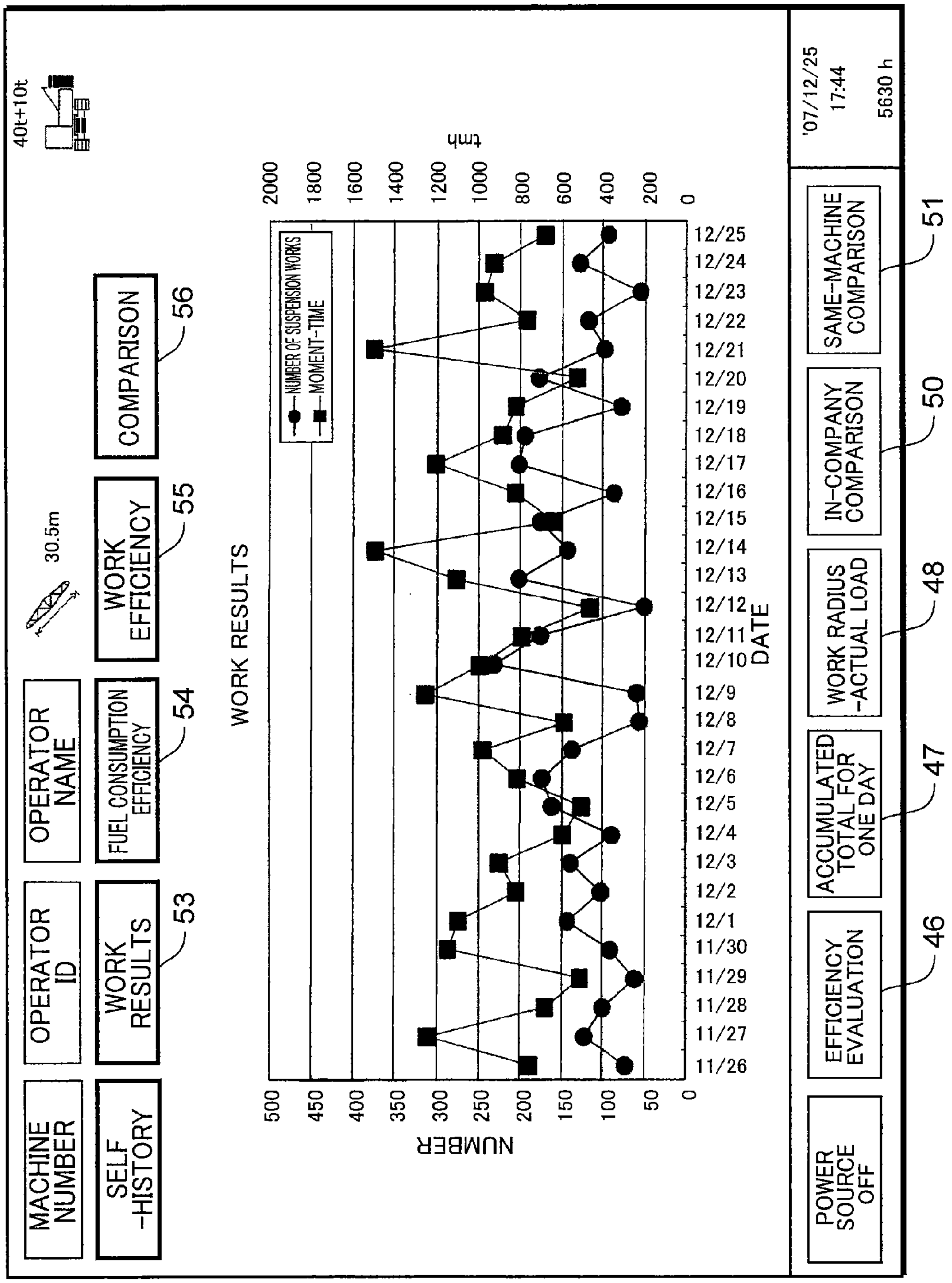
FIG. 7 shows a screen displaying the work results in the self-history displayed on the display device of the operation evaluation device.

On the screen that displays work results in self-history shown in FIG. 7, daily histories of one-day accumulated total number of suspension works and one-day accumulated total moment-time in the days in which the crane 100 has been run are shown on the same trend graph.

On the screen that displays fuel consumption efficiency in self-history shown in FIG. 8, daily histories of the amount of fuel consumed for one suspension work (fuel consumption amount per one suspension work) and the amount of fuel consumed per unit time of moment-time (fuel consumption amount per moment-time) in the days in which the crane 100 has been run are shown on the same trend graph.

On the screen that displays work efficiency in self-history shown in FIG. 9, daily histories of the number of suspension works performed per one-hour running of the crane 100 (hourly efficiency of the number of suspension works) in the days in which the crane 100 has been run and the values indicating the moment-time per one-hour of running time of the crane 100 in the days in which the crane 100 has been run (hourly efficiency of moment-time) are shown on the same trend graph.

On the screen with comparative display of indexes in self-history shown in FIG. 10, indexes in operation in present one day in which the crane 100 has been run are shown on the same time history graph. More specifically, in this screen, the variation in the number of suspension works performed, variation in moment-time, variation in instantaneous fuel consumption amount, and variation in integrated fuel consumption amount in one day are shown on the same time history graph. The instantaneous fuel consumption amount is a value indicating the amount of fuel consumed at each point of time, and the integrated fuel consumption amount is the integrated value of the instantaneous fuel consumption amount.

Figure 11:
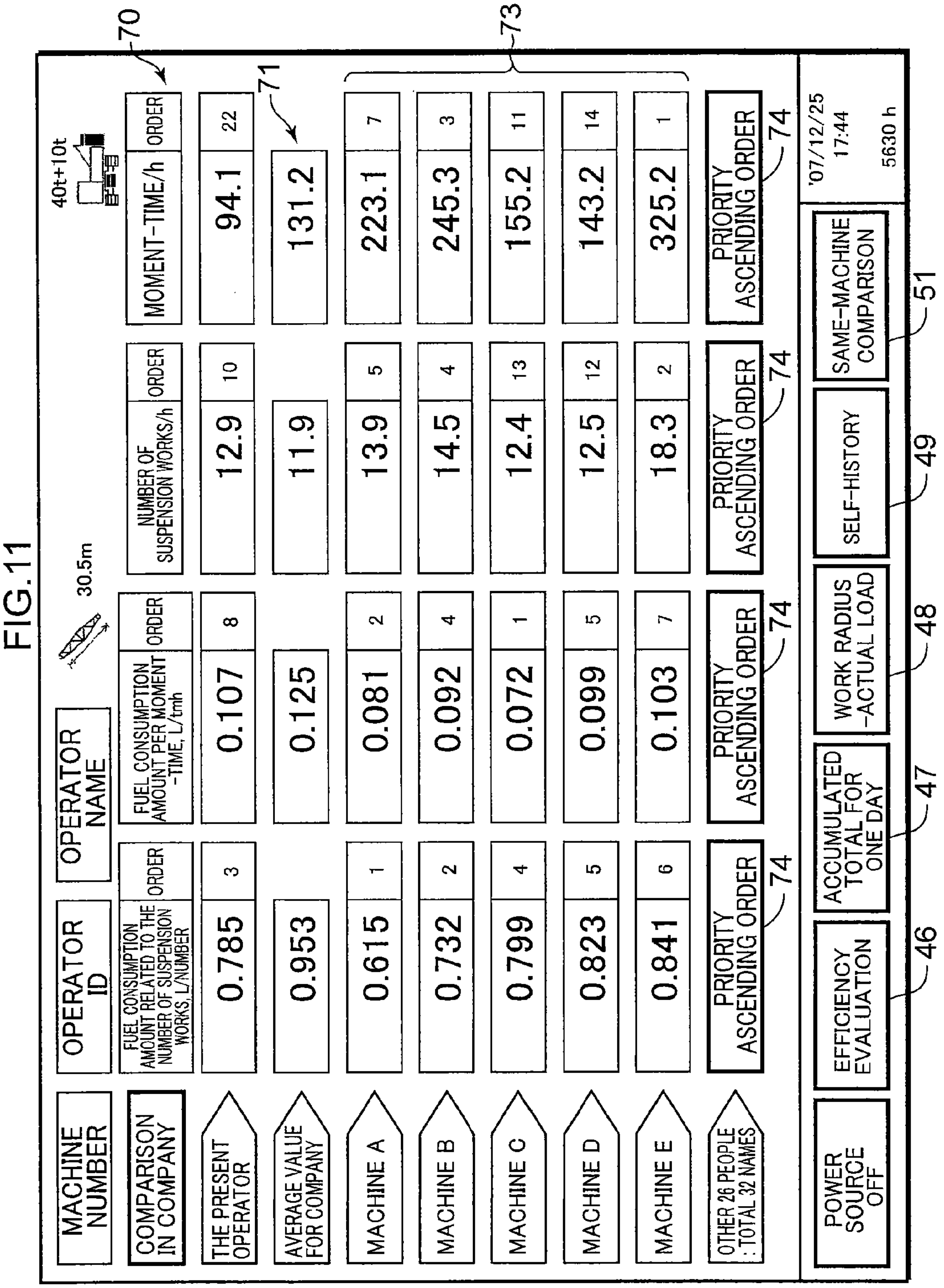
FIG. 11 illustrates the display contents of the in-company evaluation comparison screen displayed on the display device of the operation evaluation device.

The screen shown in FIG. 11 is an in-company evaluation and comparison screen that performs comparative display of data on fuel consumption indexes and work indexes relating to a plurality of operators employed in the company to which the operator belongs. The display of this screen is obtained by transmitting data on the principal operator that have been saved in the below-described database server 27 on the basis of information on the operator authenticated by the verification device 22 to the data control unit 12 via the communication device 20, transmitting data on other operators employed in the company that have been saved in the database server 27 to the data control unit 12 via the communication device 20, and performing comparative display of these data with the data control unit 12 on the display device 10.

In the region where data are displayed on this in-company evaluation and comparison screen, a principal operator result row 70 displaying results obtained for the principal operator authenticated by the verification device 22 are provided at the very top. A company average value row 71 displaying average values of results obtained for the operators employed in the company is provided below the principal operator result row. An in-company other operator result row 73 displaying side by side the results obtained for a plurality of other operators employed by the company are provided below the company average value row. The in-company other operator result row 73 displays in each row the machine number of the crane 100 operated by the operator, without displaying the names of other operators in order to protect personal information.

The principal operator result row 70 displays the fuel consumption amount related to suspension works in present one day, the fuel consumption amount per moment-time in operation in present one day, the number of suspension works per unit time in operation in present one day, and the unit moment-time in operation in present one day, from left to right in the order of description. The company average value row 71 and the in-company other operator result row 73 display the indexes of items same as those displayed in the principal operator result row 70, from left to right in the order of description. The ranking of values for the items in the results obtained by the target operators employed in the company are also displayed in display items of the principal operator result row 70 and the in-company other operator result row 73.

Priority ascending order buttons 74 are provided below the rows of the above-mentioned display items. By pushing any of these priority ascending order buttons 74, the operator switches the results obtained by other operators that are displayed in the in-company other operator result row 73 so that the values of items in the column corresponding to the priority ascending order button 74 that has been pushed are arranged in the ascending order from top to bottom from the highest value. For example, the priority ascending order buttons 74 are displayed on a screen composed of a touch panel, and the operation of pushing the priority ascending order button 74 means that the operator pushes or touches a location on the screen where the button 74 is displayed. The same is true for the below-described buttons. The buttons explained in the present embodiment may be composed of switches that are provided outside the screen and can be actually pushed, rather that be displayed on the screen.

Figure 12:
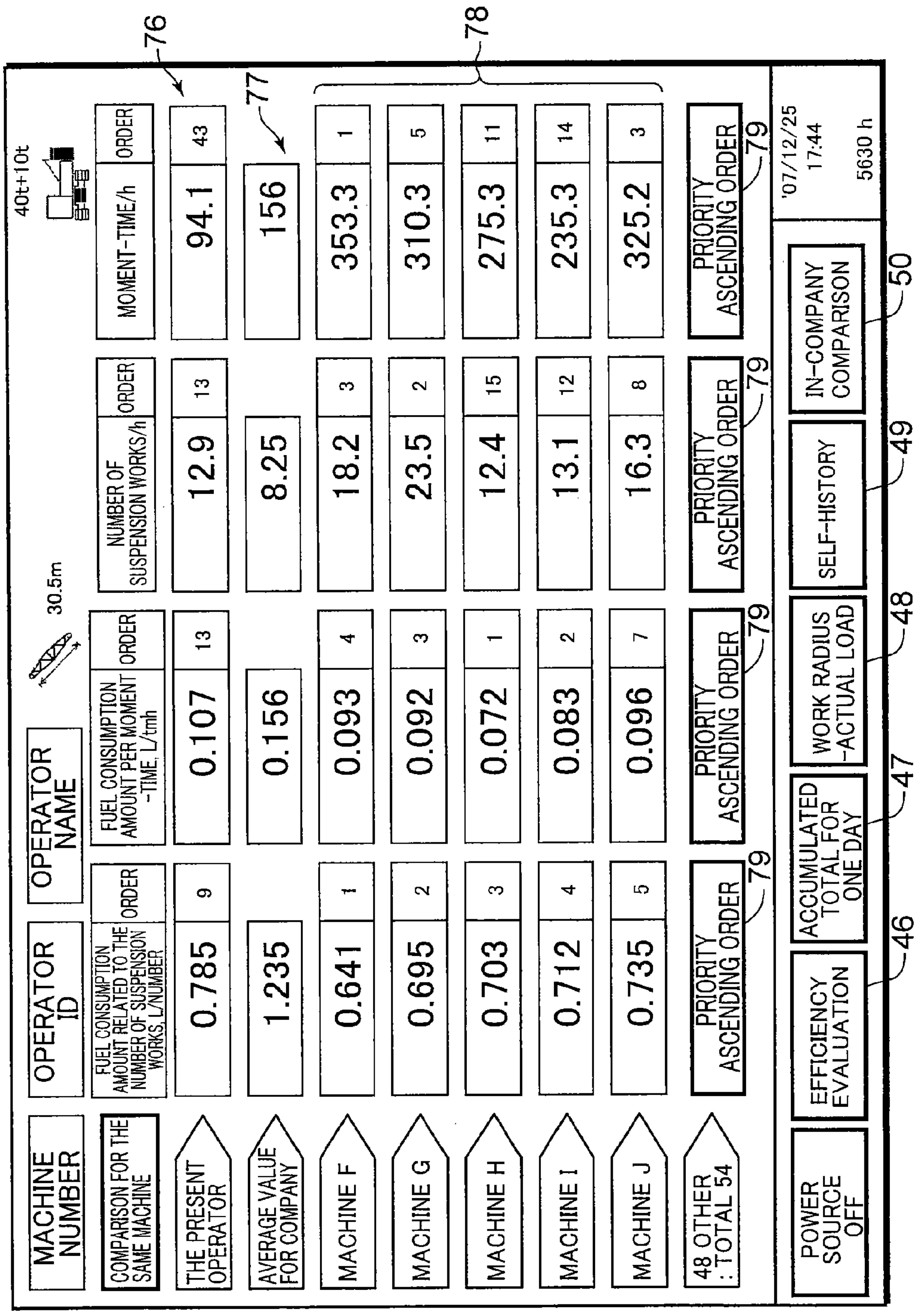
FIG. 12 illustrates the display contents of the same-machine evaluation comparison screen displayed on the display device of the operation evaluation device.

The screen shown in FIG. 12 is a same-machine evaluation and comparison screen. This screen performs comparative display of data on fuel consumption indexes and work indexes obtained by the principal operator and by a plurality of other operators that have operated cranes 100 that are machines identical to the crane 100 operated by the principal operator. Similarly to the above-described in-company evaluation and comparison screen, the display of this screen is obtained by displaying the data on each operator saved in the database server 27 on the display device 10 with the data control unit 12.

In the same-machine evaluation and comparison screen, a principal operator result row 76 displaying the results for the principal operator authenticated by the verification device 22 is provided at the very top of the region where the comparison data are displayed. A machine average value row 77 displaying average values of results obtained by all of the operators that have operated the crane 100, which is a target machine, is provided below the principal operator result row. A same-machine other operator result row 78 displaying side by side the results obtained by a plurality of other operators that have operated the crane 100, which is a target machine, is provided below the machine average value row. The same-machine other operator result row 73 displays in each row the machine number of the crane 100 operated by the operator, without displaying the names of other operators in order to protect personal information.

The other display items of the same-machine evaluation and comparison screen and the configuration of the switching display using the priority ascending order buttons 79 are similar to those of the above-described in-company evaluation and comparison screen.

The above-described screens shown in FIGS. 4 to 12 are switched when the operator pushes display buttons 46 to 51 disposed in the lower portion of the screen or display buttons 53 to 56 disposed in the upper portion of the screen (FIGS. 7 to 10).

More specifically, where the efficiency evaluation display button 46 is pushed, the efficiency evaluation screen shown in FIG. 4 is displayed, and where the one-day accumulated total display button 47 is pushed, the one-day accumulated total data display screen shown in FIG. 5 is displayed. Further, where the work radius-actual load display button 48 is pushed, the work radius-actual load distribution screen shown in FIG. 6 is displayed, and where the self-history display button 49 is pushed, the self-history work result screen shown in FIG. 7 is displayed. Further, where the in-company comparison display button 50 is pushed, the in-company evaluation and comparison screen shown in FIG. 11 is displayed, and when the same-machine comparison display button 51 is pushed, the same-machine evaluation and comparison screen shown in FIG. 12 is displayed. Further, where the work result display button 53 is pushed in the self-history screens shown in FIGS. 7 to 10, the screen displaying the work results (shown in FIG. 7) is displayed, and when the fuel consumption efficiency display button 54 is pushed, the screen displaying the fuel consumption efficiency (shown in FIG. 8) is displayed. Further, where the work efficiency display button 55 is pushed, the screen displaying the work efficiency (shown in FIG. 9) is displayed, and where the comparative display button 56 is pushed, the screen performing comparative display of indexes shown in FIG. 10 is displayed.

The configuration of the operation evaluation system of the crane 100 of the present embodiment will be described below.

Figure 3:
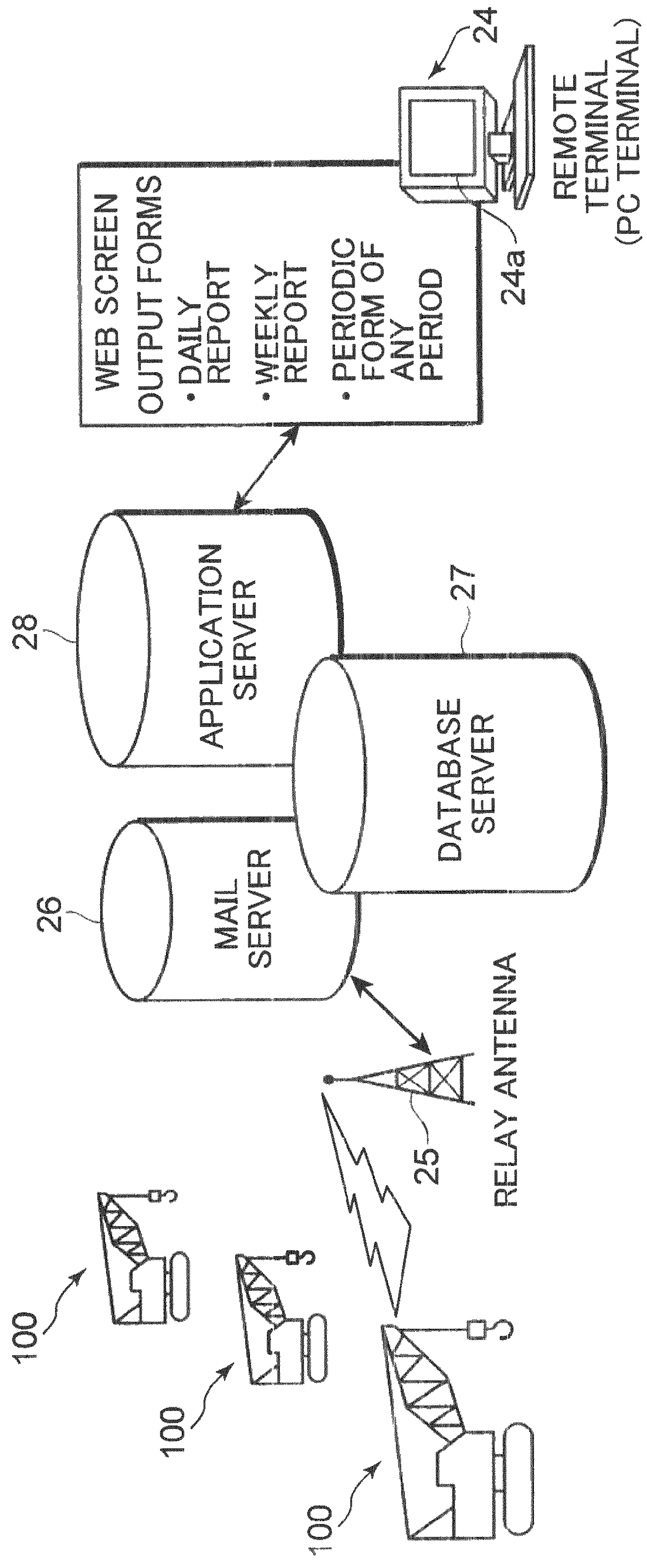
FIG. 3 illustrates schematically the configuration of the crane operation evaluation system of one embodiment of the present invention.

The operation evaluation system of the present embodiment is provided with the above-described operation evaluation device, the communication device 20, a remote terminal 24 (see FIG. 3), a relay antenna 25, a mail server 26, the database server 27, and an application server 28. Further, in the present embodiment, a plurality of cranes 100 are present, and each of the cranes 100 is similarly provided with the abovementioned configuration including the operation evaluation device and the communication device 20.

The remote terminal 24 displays various data including the second fuel consumption index and second work index transmitted from the communication devices 20 of the cranes 100. The remote terminal is located in an office at any location remote from the cranes 100. The remote terminal 24 includes a PC terminal and is provided with a display device 24*a* that displays the various data.

The data transmitted from the communication devices 20 of the cranes 100 are processed in the form suitable for data processing via the relay antenna 25 and the mail server 26 and then accumulated in the database server 27. The database server 27 is included in the concept of a server in accordance with the present invention. Further, the data of ID of operators that is used for verifying the operator in the verification device 22 is recorded in advance in the database server 27. The application server 28 stores programs that process statistically the data accumulated in the database server 27 for each operator separately and creates the below-described various forms. The application server 28 is included in the concept of a statistical processing unit in accordance with the present invention.

Figure 13A:
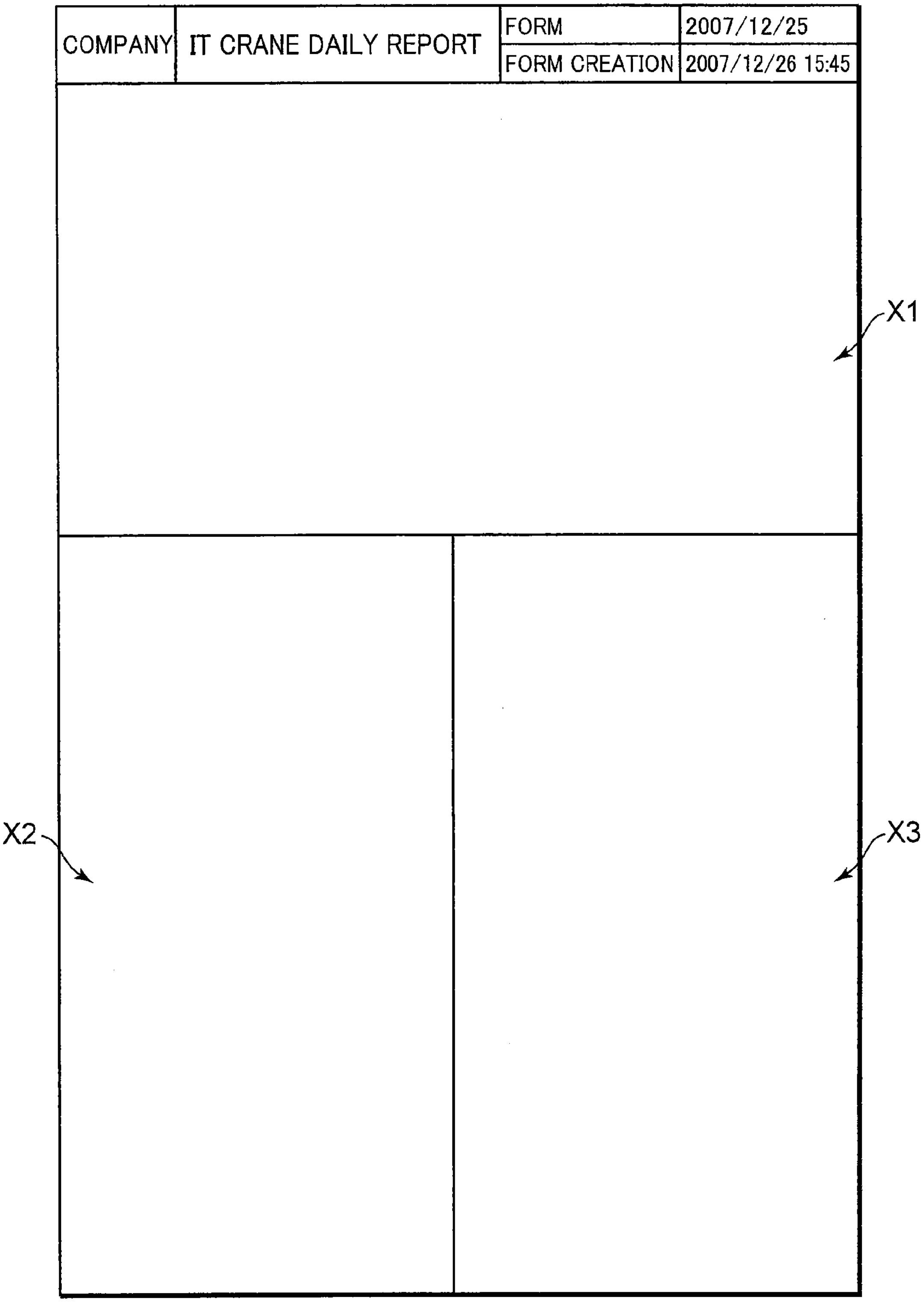
FIG. 13A shows a frame of a daily report displayed on the remote terminal.
Figure 13B:
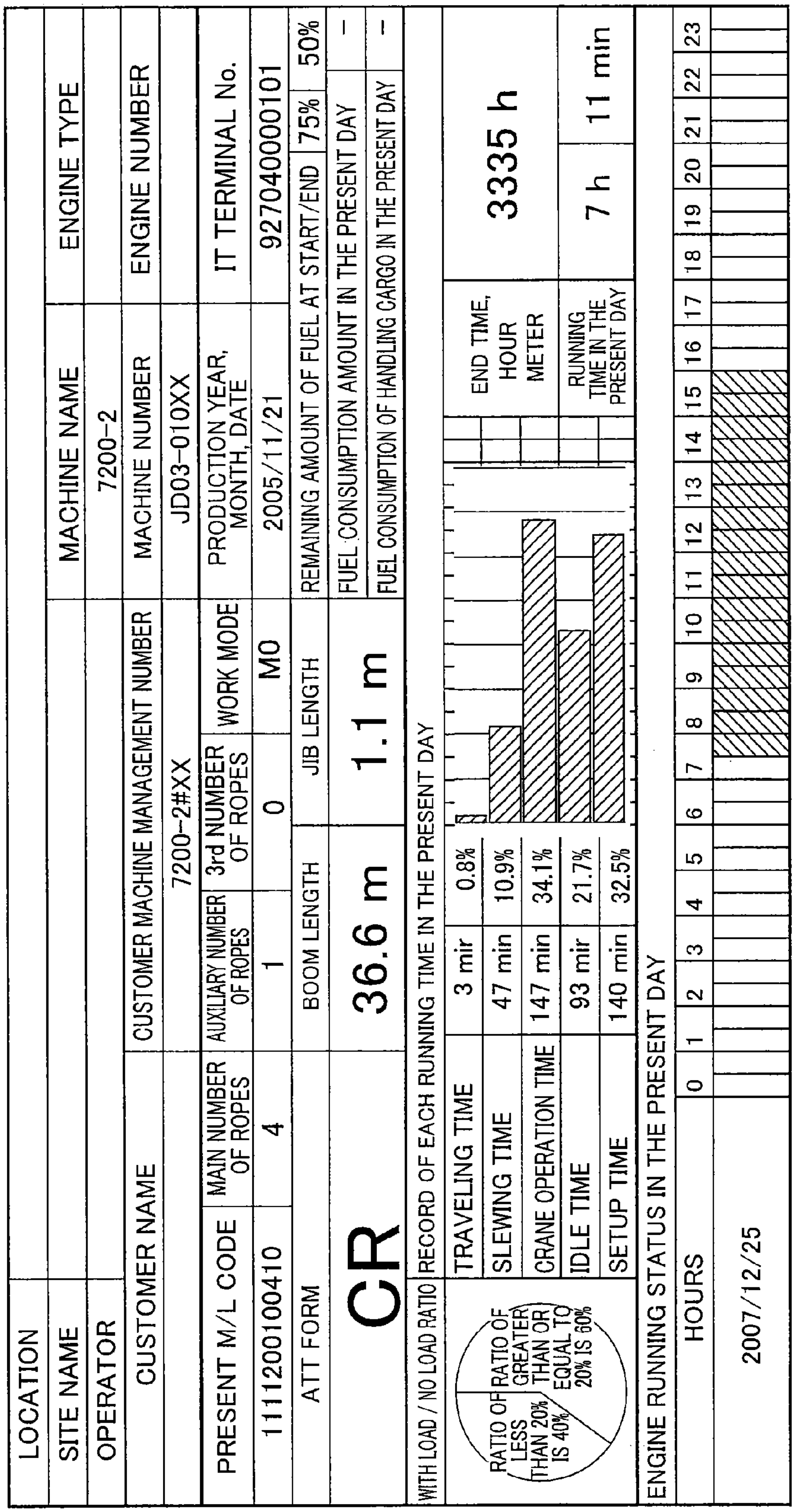
FIG. 13B shows an enlarged view of contents displayed in a region X1 of FIG. 13A.
Figure 14A:
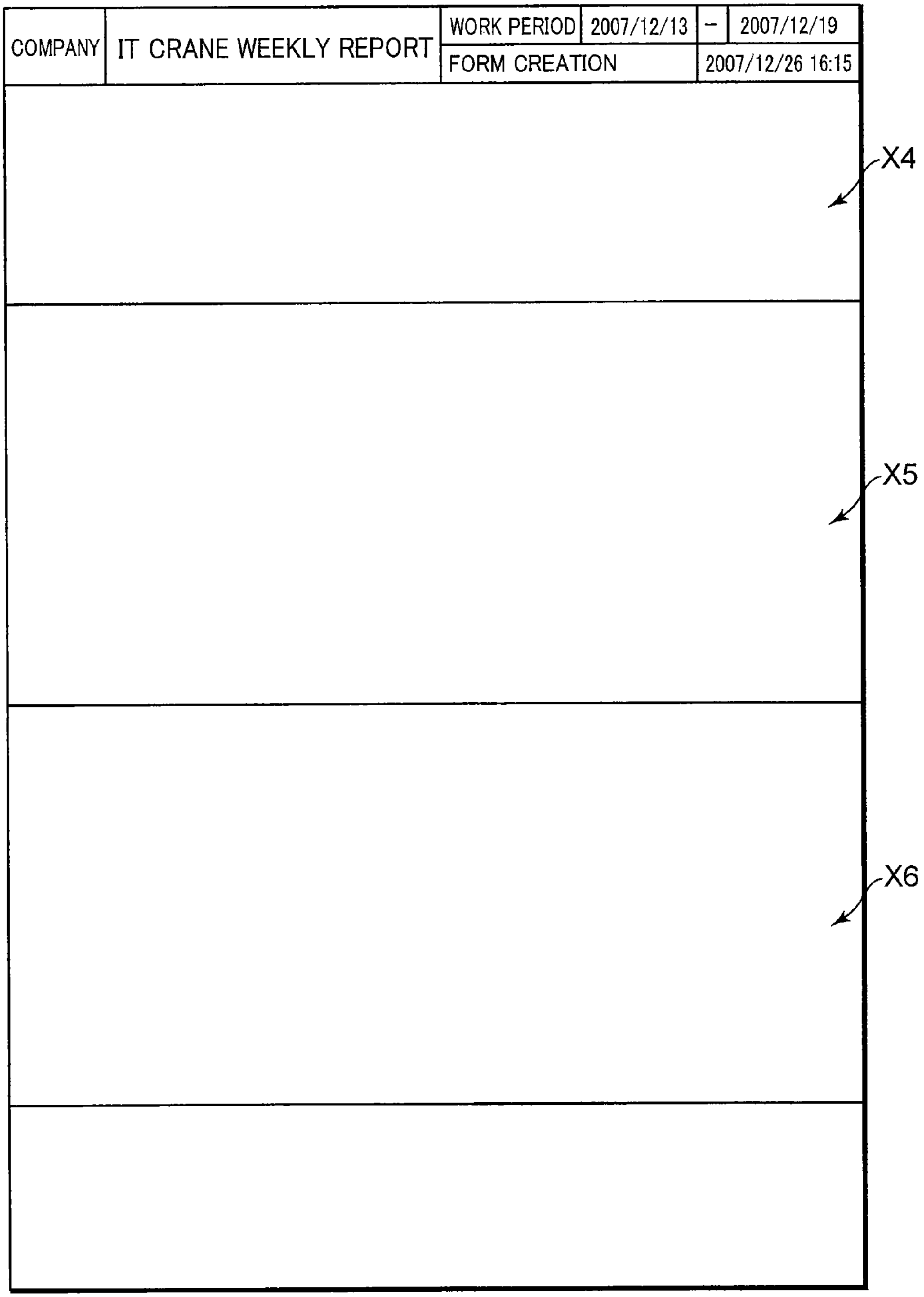
FIG. 14A shows a frame of a weekly report displayed on the remote terminal.
Figure 14B:
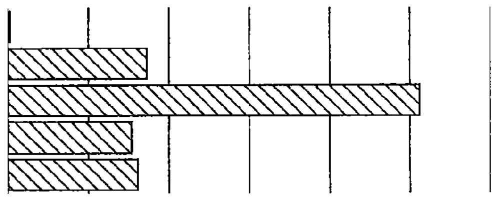
FIG. 14B shows an enlarged view of contents displayed in a region X4 of FIG. 14A.
Figure 15A:
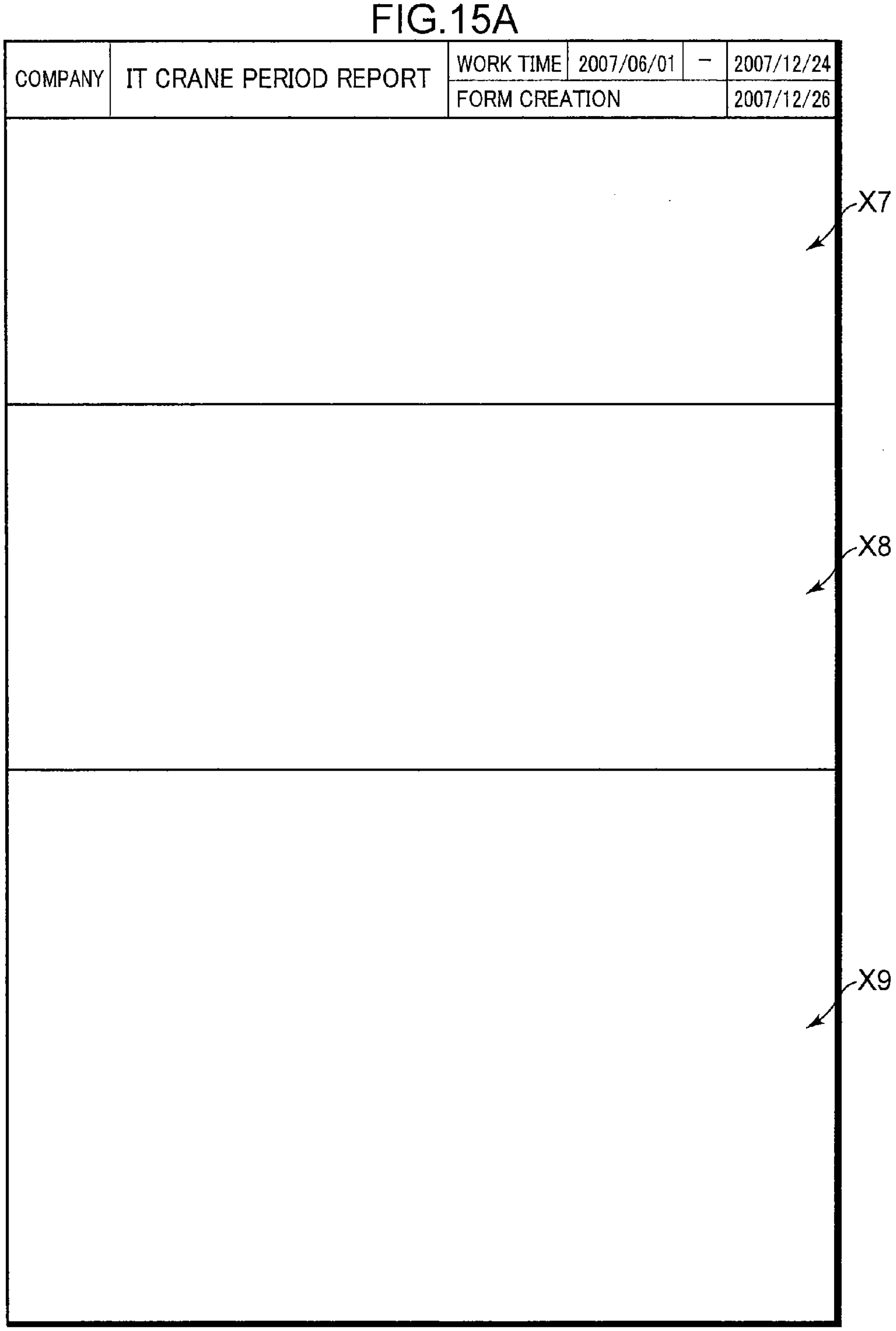
FIG. 15A shows a frame of a periodic report displayed on the remote terminal.
Figure 15D:
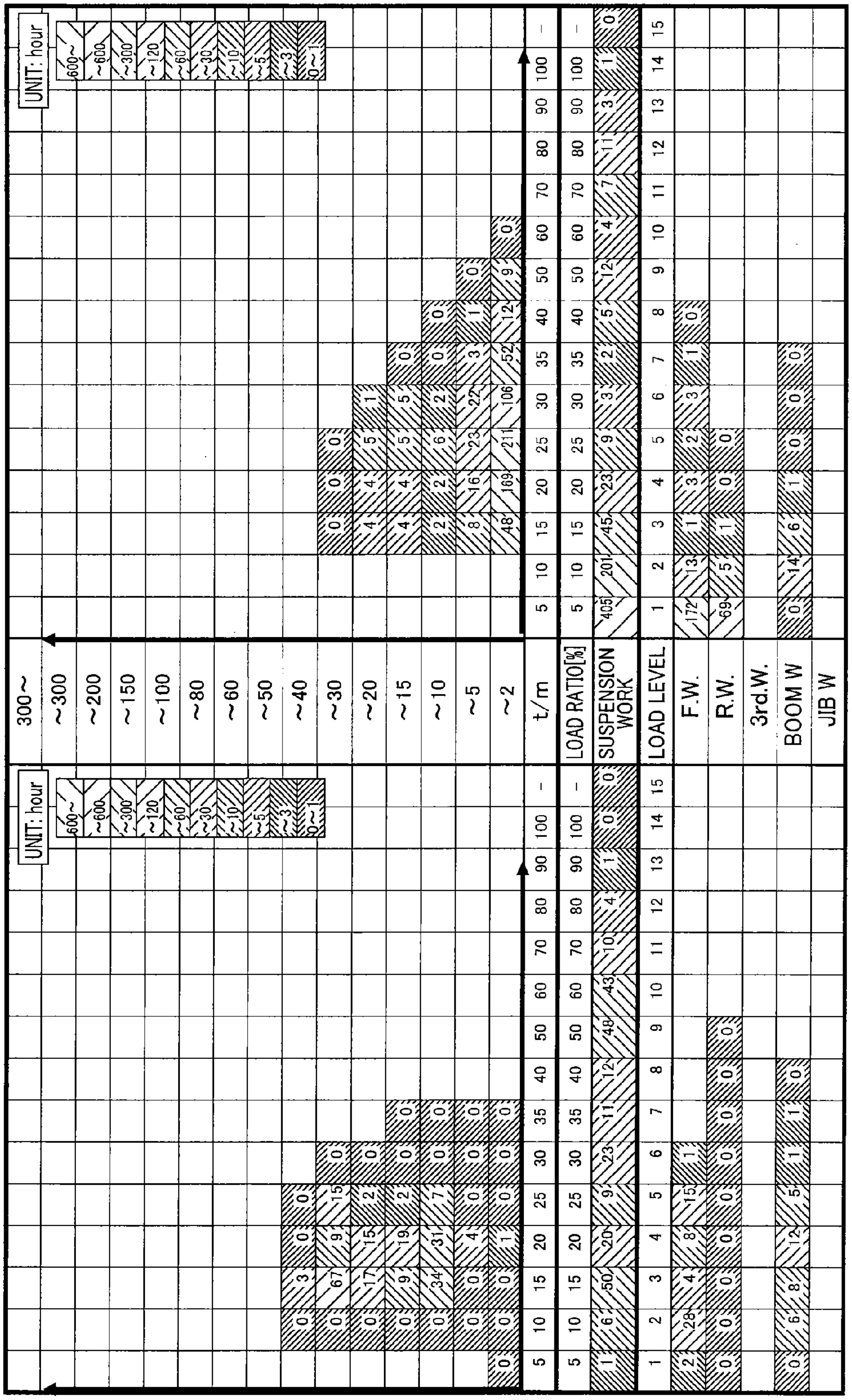
FIG. 15D shows an enlarged view of contents displayed in a region X9 of FIG. 15A.

The remote terminal 24 can be connected to the servers 26 to 28 via internet. The remote terminal 24 also has a function of updating the database of ID recorded in the database server 27 by transmitting the ID of the operator allowed to operate the crane 100. Thus, the remote terminal 24 also has a function of an operator information update unit in accordance with the present invention. Further, the data accumulated in the database server 27 are processed according to the program stored in the application server 28 by selecting a form output menu from the WEB screen displayed on the display device 24*a* in the remote terminal 24. As a result, various forms shown in FIGS. 13 to 15 are created and displayed on the screen of the display device 24*a* of the remote terminal 24. These forms can be also printed out with the remote terminal 24.

The form shown in FIGS. 13A-13D is a daily report indicating the collected results relating to data for one day in which the crane 100 has been run. Data such as the location site of the crane 100, field site name, name of the operator operating the crane, machine name of the crane 100, machine number, type of the engine 109, and machine number of the engine 109 are displayed in the upper portion of the daily report. Setting data illustrating the configuration of the crane 100, such as the number of turns of the ropes 115*a*, 115*b* corresponding to hooks 108*a*, 108*b* of the crane 100, work mode, and length of the boom 106, and also data relating to the production date of the crane 100, identification number of the remote terminal 24, and fuel consumption amount are displayed below the aforementioned data.

A diagram indicating time allocation for a load-free work and a work under a load in the implemented suspension work and a record for each running time of one day are displayed further below. The traveling time, slewing time, crane operation time, idling time, and setup time are displayed by numerical values (min), ratios (%) to the total running time, and columnar graphs in the record row of each running time. The measured time of a time meter at a completion time of the day in which the crane 100 has been run and the running time of the crane 100 in this day are also shown in the record row of each running time.

A running state of the engine 109 in one day in which the crane 100 has been run is displayed further below the aforementioned displayed data. A running time band of the engine 109 is shown in the running state display row.

The contents similar to the correlated distribution of work radius and actual load that is shown in the work radius-actual load distribution screen in FIG. 6 is shown on the right side below the running state display row, and the distribution of load ratio of the performed suspension works is displayed therebelow. The distribution of load ratio is displayed by dividing the load ratio of suspension works into predetermined ranges and combining the time intervals in which the suspension works corresponding to the load ratios of each divided range have been performed. The distribution of load level applied to the ropes 115*a*, 115*b* suspending the hooks 108*a*, 108*b* and the distribution of load level applied to the guy line 106*b* suspending the boom 106 in a crane work are displayed below the displayed distribution of load ratio. In the display of load level, the loads applied to the ropes 115*a*, 115*b* and the guy line 106*b* are divided into a plurality of levels, and the time intervals in which the load corresponding to each level is applied to the ropes 115*a*, 115*b* and guy line 106*b* are collected for display for each level.

Data similar to the revolution speed distribution diagram of the engine 109 and the operation interval distribution diagram of the operation lever 118 shown in the one-day accumulated total data screen in FIG. 5 are displayed below the displayed distribution of load.

A crane work record, an overload preventing device record, an information generation status, a communication status, position information and information on wind velocity are displayed to the left of the display portion of the correlated distribution of the work radius-actual load.

The results relating to crane works performed in one day in which the crane 100 has been run are displayed in the crane work record. More specifically, the number of suspension works performed in one day, accumulated total number of suspension works that have been performed from past to present, moment-time in the crane works in one day, accumulated total moment-time from past to present, and maximum load ratio and maximum actual load in the suspension works in one day are displayed in the crane work record.

The operation results of the overload preventing device 124 in one day in which the crane 100 has been run are displayed in the overload preventing device record. The number of overload occurrences in present one day and the number of over-hoisting occurrences in present one day are displayed in the overload preventing device record. The number of over-hoisting occurrences of the boom 106 is also displayed herein.

Safety information or other information is displayed in the information generation status.

The number of data transmissions performed from the communication device 20 in target one day is displayed in the communication status.

Information relating to the position at which the crane 100 is present is displayed in the position information.

An average wind velocity and maximum wind velocity at the location of crane work are displayed in the wind velocity information.

The form shown in FIGS. 14A-14D is a weekly report showing the combined results relating to the running status of the crane 100 for one week. The contents similar to those shown in the upper portion of the above-described daily report are displayed in the upper portion of the weekly report. A record of the running time within one week is displayed therebelow. This record shows the results combined in a period of one week with respect to the items similar to those of the record of the running time within one day in the above-described daily report. The running state of the engine 109 within one week is displayed therebelow. In the running state display row, the running state of the engine 109 in one day is shown for one week.

The crane work record, overload preventing device record, information generation status, and communication status combined for a one-week period are displayed below the running state display row of the engine 109. The revolution speed distribution diagram of the engine 109 and the operation interval distribution diagram of the operation lever 118 combined for one-week period are displayed below these displays.

The form shown in FIGS. 15A-15D is a periodic report showing the combined results relating to the running status of the crane 100 for a predetermined period. The contents similar to that shown in the upper portion of the above-described daily report is displayed in the upper portion of the periodic report. A diagram indicating time allocation for a load-free suspension work and a suspension work under a load that have been implemented in the aforementioned predetermined period and a record for each running time of the predetermined period are displayed further below. Here, the results obtained by combining the display items corresponding to the daily report for the predetermined period are displayed.

Data relating to the overload preventing device 124 are displayed in the lower display zone. Thus, numbers obtained by totalizing for the predetermined period for the items similar to those of the overload preventing device record of the daily report are displayed in this display zone, and values of these numbers relating to one day are shown.

The occurrence frequencies of the aforementioned safety information and other information are displayed below the data relating to the overload preventing device 124. The number of running days of the crane 100, number of communication occurrences, fuel consumption amount, fuel consumption during work, and number of times the engine 109 has been started in the predetermined period are displayed below the occurrence frequencies.

A region for comparatively displaying various data relating to two modes of crane work performed in the predetermined period is provided further below. The travel time, slewing time, operation time, idling time, setup time, total time in each mode, maximum actual load, average value of maximum actual load, number of running days in each mode, number of suspension works, moment-time, and average moment-time are displayed for the crane 100 by numerical values in the upper portion of the comparative display region. The correlated distribution diagram of work radius and actual load, distribution diagram of load ratio of the suspension work, distribution diagram of load level applied to the ropes 115*a*, 115*b* suspending the hooks 108*a*, 108*b*, and distribution diagram of load level applied to the guy line 106*b* suspending the boom 106 in the predetermined period in each mode are displayed in a comparative manner in the lower portion of the comparative display region.

Data on the display contents of screens shown in FIGS. 4 to 12 that are displayed on the display devices 10 of the cranes 100 are transmitted from the communication devices 10 of the cranes 100 and accumulated in the database server 27. The remote terminal 24 can perform screen display similar to that shown in FIGS. 4 to 12 on the display device 24 by fetching the data on the display contents from the database server 27. The remote terminal 24 can also print out the contents shown in FIGS. 4 to 12.

Figure 16:
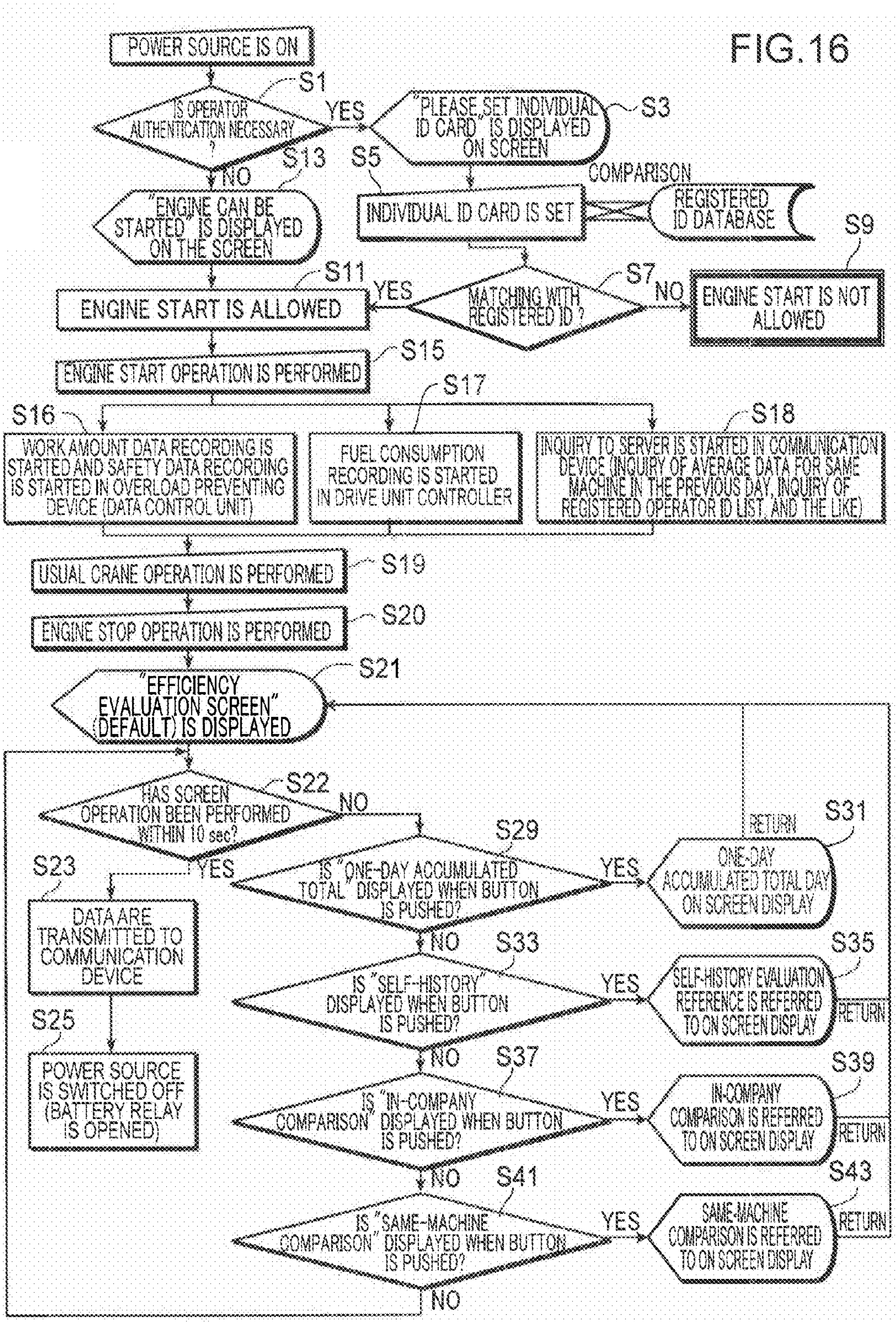
FIG. 16 is a flowchart to explain the operation of the crane operation evaluation device of an embodiment of the present invention.

The operation of the operation evaluation device of the crane 100 according to the present embodiment will be explained below with reference to FIG. 16.

First, the operator switches ON the power source switch, and the verification device 22 determines whether the operator should be authenticated (step S1). When the authentication of the operator is determined to be necessary, the data control unit 12 displays a message "PLEASE SET THE INDIVIDUAL ID CARD" on the display device 10 (step S3). The operator then sets the individual ID card into the verification device 22 (step S5), the data base of operators' ID that has been recorded in advance is read from the database server 27 to the communication device 20 and the individual ID of the operator is compared with the registered ID of the database. The verification device 22 then determines whether the individual ID of the operator matches the registered ID (step S7). When it is determined that the individual ID of the operator does not match the registered ID, the start of the engine 109 is not allowed (step S9). In this case, the engine 109 cannot be started and the power source of the crane 100 should be switched OFF. When it is determined that the individual ID of the operator matches the registered ID, the start of the engine 109 is allowed (step S11).

When the authentication of the operator is determined to be unnecessary in step S1, the data control unit 12 displays a message "YOU CAN START THE ENGINE" on the display device 10 (step S13). The start of the engine 109 of step S11 is thereafter allowed.

Where the operator then starts the engine 109 (step S15), the storage unit 14 of the data control unit 12 starts recording work amount data for constituting the work indexes and safety data for constituting the safety indexes (step S16), the drive unit controller 122 starts recording fuel consumption data for constituting the fuel consumption indexes (step S17), and the communication device 20 starts inquiring the database server 27 about data on crane works performed by other operators of the company, data on crane works performed by other operators who have operated the same machine, data on self-history, and various data relating to the previous one day in which the crane 100 has been run (step S18).

The operator then performs the usual crane work (step S19) and the operator thereafter performs a stopping operation of the engine 109 (step S20). After the stopping operation of the engine 109 has been performed, the efficiency evaluation screen shown in FIG. 4 is displayed as the very first screen to be displayed on the display device 10 (step S21).

The data control unit 12 then determines whether or not a screen operation of the display device 10 is performed within 10 sec, that is, determines whether or not the display buttons 46 to 51 for switching the screen on the display device 10 have been pushed within 10 sec (step S22). Where the data control unit 12 determines that a screen operation has not been performed within 10 sec, the data recorded in the storage unit 14 and the data recorded in the drive unit controller 122 are transmitted to the communication device 20 (step S23) and then the power source is switched off (step S25).

Where the data control unit 12 determines in step S22 that the screen operation of the display device 10 has been performed within 10 sec, the data control unit then determines whether the display button that has been pushed on the display device 10 is the one-day accumulated total display button 47 (step S29).

Where the data control unit 12 determines in step S29 that the display button that has been pushed on the display device 10 is the one-day accumulated total display button 47, the one-day accumulated total data screen shown in FIG. 5 is displayed on the display device 10 (step S31). The processing of the above-described step S21 and subsequent steps is then repeatedly executed.

Where the data control unit 12 determines in step S29 that the display button that has been pushed on the display device 10 is not the one-day accumulated total display button 47, the data control unit 12 then determines whether or not the display button that has been pushed on the display device 10 is the self-history display button 49 (step S33). Where the data control unit 12 determines that the display button that has been pushed on the display device 10 is the self-history display button 49, the work result screen of the self-history shown in FIG. 7 is displayed on the display device 10 (screen S35). The processing of the above-described step S21 and subsequent steps is then repeatedly executed.

Where the data control unit 12 determines in step S33 that the display button that has been pushed on the display device 10 is not the self-history display button 49, the data control unit 12 then determines whether or not the button that has been pushed on the display device 10 is the in-company comparison display button 50 (step 37). Where the data control unit 12 determines that the button that has been pushed on the display device 10 is the in-company comparison display button 50, the in-company evaluation comparison screen shown in FIG. 11 is displayed on the display device 10 (step S39). The processing of the above-described step S21 and subsequent steps is then repeatedly executed.

Where the data control unit 12 determines in step S37 that the button that has been pushed on the display device 10 is not the in-company comparison display button 50, the data control unit then determines whether or not the button that has been pushed on the display device 10 is the same-machine comparison display button 51 (step S41). Where the data control unit 12 determines that the button that has been pushed on the display device 10 is the same-machine comparison display button 51, the same-machine evaluation comparison screen shown in FIG. 12 is displayed on the display device 10 (step S43). The processing of the above-described step S21 and subsequent steps is then repeatedly executed.

Where the data display unit 12 determines in step S41 that the button that has been pushed on the display device 10 is not the same-machine comparison display button 51, the processing of the above-described step S22 and subsequent steps is then repeatedly executed.

The operation evaluation device of the crane 100 of the present embodiment is operated as described hereinabove.

As explained above, in the present embodiment, after a stopping operation of the engine 109, the first fuel consumption index for analyzing a fuel consumption efficiency of the crane work performed in the preceding work period, namely, from the most recent start of the engine 109 and before the engine 109 is stopped by the stopping operation, and the first work index for analyzing the contents of the crane work are displayed on the display device 10. Therefore, the operator can sufficiently review the fuel consumption efficiency and work efficiency of the crane work that he performed himself, on the basis of the displayed contents of the display device 10. As a result, the operator can be stimulated to improve fuel consumption efficiency and work efficiency, and thereby the total cost of the crane work can be reduced. In addition, in the present embodiment, since the first fuel consumption index and first work index are displayed on the display device 10 after the stopping operation of the engine 109, the operator can concentrate his attention on the particular work while the crane work is being performed, but after the stopping operation of the engine 109, the operator can concentrate his attention only on checking the first fuel consumption index and first work index that have been displayed on the display device 10. Therefore, the operator can sufficiently maintain the accuracy of the crane work and also review the contents of the work that he performed himself. As a consequence, with the present embodiment, the operator can sufficiently maintain the accuracy of the crane work and also review the work contents, and the total cost of the crane work can be reduced.

Further, in the present embodiment, the first fuel consumption index includes the present fuel consumption amount related to the number of suspension works and the present fuel consumption amount related to the moment-time. Therefore, the operator can review the fuel consumption efficiency of the crane work that he performed himself from the standpoint of these two fuel consumption amounts. The operator can determine that the fuel consumption efficiency of the crane work that he performed himself is good when these fuel consumption amounts are small.

Further, in the present embodiment, the first work index includes the present number of suspension works per unit time and the present unit moment-time. Therefore, the operator can review the work efficiency of the crane work that he performed himself from the standpoint of these values. The operator can determine that the efficient crane work has been performed when the present number of suspension works per unit time is large and can determine that a large number of crane works have been performed when the value of the present unit moment-time is large.

Further, in the present embodiment, after the stopping operation of the engine 109, the second fuel consumption index for analyzing the fuel consumption efficiency of a crane work performed after the very first start of the engine 109 and before the engine is stopped 109 by the stopping operation in a day in which the engine 109 has been run and the second work index for analyzing the contents of the crane work are displayed on the display device 10. Therefore the operator can review together the fuel consumption efficiency and work efficiency from the very first crane work in the day to the most recent crane work that has just been stopped, on the basis of the second fuel consumption index and second work index displayed on the display device 10.

In the present embodiment, the second work index includes the number of suspension works performed within operation in present one day, moment-time in operation in present one day, accumulated total operation time in operation in present one day, and operation interval distribution in operation in present one day. Therefore, the operator can review the work efficiency from the very first crane work to the most recent crane work that he performed himself in the present day from the standpoint of these indexes.

The operator can determine that the larger is the number of suspension works performed in operation in present one day, the larger is the number of cargo handling works in the crane works that he performed himself in the present one day. Further, the operator can determine that the longer is the moment-time in operation in present one day, the larger is the volume of work in the crane works that he performed himself in operation in present one day. The operator can also determine that the larger is the accumulated total operation time in operation in present one day, the larger is the number of crane operations in the crane works that he performed himself in the present one day. The operator can determine the size of values of the second work index by comparing the values of the second work index in operation in present one day with the corresponding values in the previous one day. In addition, the operator can grasp, from the operation interval distribution in operation in present one day, the duration of the period in which the operation lever 118 has not been operated in the crane work in present one day that has been performed by the operator.

In the present embodiment, the second work index includes a revolution speed distribution of the engine 109 after the very first start of the engine 109 in the day in which the engine 109 has been run and before the engine 109 is stopped by the stopping operation. Therefore, the operator can review the fuel consumption efficiency from the very first crane work to the most recent crane work that he performed himself in the present day from the standpoint of the revolution speed distribution of the engine 109. By thus displaying the revolution speed distribution of the engine 109 on the display device 10, the operator can immediately recognize whether the engine 109 has been controlled so as to match the work amount in the works performed from the very first crane work to the most recent crane work that he performed himself in this day.

Further, in the present embodiment, the calculation unit 16 of the data control unit 12 extracts and statistically processes a portion of the revolution speed distribution of the engine 109 that corresponds to the hoisting time and lowering time of the hooks **108*a*, 108*b* and displays the statistically processed data on the display device 10. Therefore, the operator can easily review whether unnecessary fuel has been consumed during the lowering operation of the hooks 108*a*, 108*b* that required no power in comparison with the hoisting time of the hooks 108*a*, 108*b***.

Further, in the present embodiment, the calculation unit 16 of the data control unit 12 combines for each of a plurality of predetermined ranges the numerical values of data relating to the engine revolution speed distribution in operation in present one day, engine revolution speed distribution during hoisting, engine revolution speed distribution during lowering, operation interval distribution in operation in present one day, and correlated distribution of work radius and actual load in operation in present one day, displays the results obtained by combining for each range with numerical values and displays the size of the numerical values with colors in each of a plurality of divided boxes on the display device 10. Therefore, the distributions of data can be recognized by displaying with numerical values and colors corresponding to the size thereof. As a result, the operator can directly and easily grasp the trends in the distributions of these data.

Further, in the present embodiment, variations in the number of suspension works, moment-time, instantaneous fuel consumption amount, and integrated fuel consumption amount in operation in present one day in which the crane 100 has been run are displayed in the form of respective time history graphs on the display device 10. Therefore, the operator can readily grasp changes in these data with time. Further, the operator can easily recognize a time zone in which fuel consumption is large, a time zone in which fuel consumption is small, or waste time in which no work has been performed can be easily recognized.

Further, in the present embodiment, variations in the number of suspension works, moment-time, instantaneous fuel consumption amount, and integrated fuel consumption amount in operation in present one day in which the crane 100 has been run are displayed on the same time history graph. Therefore, the operator can easily compare changes in these data with time. Therefore, the operator can easily review whether the crane works have been performed with consideration for both the fuel consumption efficiency and the work efficiency from the very first crane work to the most recent crane work in this day, that is, how effectively the fuel consumed on running of the engine 109 has been converted to the crane works.

Further, since the crane 100 is provided with the verification device 22 for verifying, before the engine 109 is started, whether or not the operator that will operate the crane 100 is the pre-registered operator, it is possible to confirm that the operator that will operate the crane 100 is not different from the pre-registered operator with the verification device 22. In the present embodiment, when the operator that will operate the crane 100 is not the pre-registered operator, the start of the crane 109 is not allowed, and therefore the crane 100 is prevented from being stolen and an unauthorized person is prohibited from performing a crane work.

In the present embodiment, the history for each one day of the accumulated total number of the suspension works performed in the one day, accumulated total moment-time in this one day, fuel consumption amount per suspension operation, fuel consumption amount per moment-time, time efficiency of the number of suspension works, and time efficiency of the moment-time relating to the operator authenticated by the verification device 22 is displayed as trend graphs on the display device 10. Therefore, the operator can confirm the history data for each day by trend graphs with respect to the crane works that he performed himself. As a result, the operator can easily check whether his level of proficiency in operating the crane has improved.

Further, in the present embodiment, the operation evaluation system of the crane 100 is provided with the communication device 20 provided at the crane 100 and the remote terminal 24 disposed at a location apart from the crane 100, and the remote terminal 24 displays data on the second fuel consumption index and second work index transmitted from the communication device 20. Therefore, with the operation evaluation system of the crane 100 of the present embodiment, data on the second fuel consumption index and second work index can be checked from the remote terminal 24 at a location apart from the crane 100. Therefore, a manager can grasp the fuel consumption efficiency and work efficiency of the crane work performed by the operator even when the manager is at a location apart from the work site.

Further in the present embodiment, data on the second fuel consumption index and second work index of a plurality of cranes 100 are transmitted by the respective communication devices 20 provided at each of the cranes 100, and the remote terminal 24 displays the data on the second fuel consumption index and second work index for each crane 100 that have been transmitted from the communication devices 20. Therefore, a manager can grasp the fuel consumption efficiency and work efficiency of the crane works performed by the plurality of cranes 100 even when the manager is at a location apart from the work site.

Further, in the present embodiment, data on the second fuel consumption index and second work index transmitted from the communication device 20 of the crane 100 are statistically processed separately for the operators on the basis of operator information transmitted from the communication device 20 by an application (program) stored in the application server 28. The statistically processed data are displayed as forms on the remote terminal 24. Therefore, a manager can grasp the fuel consumption efficiency and work efficiency of the crane works performed by each operator separately for each operator at a location apart from the work site.

Further in the present embodiment, the data control unit 12 displays on the display device 10 data of the fuel consumption amount per suspension work in present one day, fuel consumption amount per moment-time in operation in present one day, number of suspension works per unit time in operation in present one day, and unit moment-time in operation in present one day relating to crane work performed by the operator authenticated by the verification device 22 and also the corresponding data relating to other operators that have been read from the database server 27. These data are displayed to be compared with each other. Therefore, the operator can easily grasp the level of fuel consumption efficiency and work efficiency of crane works that he performed himself in comparison with the fuel consumption efficiency and work efficiency of crane works performed by other operators.

When the comparative display on the display device 10 is performed among the operators employed in the same company, advantageous features of crane works performed by each operator of the company can be quantitatively evaluated. As a result, the level of crane works performed by all of the operators of the company can be raised.

Further in the present embodiment, the remote terminal 24 statistically processes, for each predetermined period, the safety index for the operator authenticated by the verification device 22. Where the operator or manager confirms data on the safety index that has been statistically processed by the remote terminal 24, the operator or manager not only determines fuel consumption efficiency and work efficiency of the crane works performed by the operator, but also reviews the safety level of the performed operations.

Further in the present embodiment, the remote terminal 24 transmits information on the operators allowed to operate the crane 100 and thereby updates information on the operators that has been recorded in advance in the database server 27 and is used for authenticating the operator with the verification device 22. Therefore, the manager can update information on operators allowed to operate the crane from a location apart from the work site, without visiting the work site. The convenience for the manager is thus improved.

In the embodiment disclosed herein, all of the features are merely exemplary and should not be construed as limiting. The scope of the present invention is defined by the claims, rather than by the description of the embodiment, and includes all of the changes within the meaning and scope equivalent to the claims.

For example, the operation evaluation device and operation evaluation system in accordance with the present invention can be applied to a luffing crane that uses as a raising/lowering member an attachment having a boom and a jib connected to a tip of the boom, a wheeled crane that travels on wheels, a stationary crane, and so on.

Further, in the above-described embodiment, the size of numerical values in representation of numerical value distribution of indexes is displayed with colors, but such feature is not limiting and the size of numerical values may be also displayed by steric 3D graphs.

Further, the calculations of the operation interval and the operation time based on the operation signals of the operation lever 118 and calculations of the engine revolution speed distribution based on the data on revolution speed of the engine 109 can be also performed by the drive unit controller 122 instead of the calculation unit 16 of the data control unit 12. In this case, by connecting the communication device 20 to the drive unit controller 122 and enabling the communication between the communication device 20 and the drive unit controller 122, it is possible to transmit the determined fuel consumption indexes and work indexes from the drive unit controller 122 to the communication device 20 and also receive the data transmitted from the servers 26 to 28 by the communication device 20 and receive these data from the communication device 20 by the drive unit controller 122. In this case, the drive unit controller 122 becomes included in the concept of the data control unit in accordance with the present invention.

Further, a distribution of the depression degree of the accelerator 120, that is, a distribution of the instruction amount of fuel injection in the engine 109 may be also included in the fuel consumption indexes.

After the operator has performed a stopping operation of the engine 109, the data control unit 12 may display the first fuel consumption index and the first work index on the display device 10 in response to an operation performed by the operator or another person to display a screen on the display device 10. In this case, the second fuel consumption index and the second work index may be displayed together with the first fuel consumption index and first work index on the display device 10.

SUMMARY OF THE EMBODIMENT

The above-described embodiment is summarized below.

Thus the crane operation evaluation device according to the above-described embodiment is a device for evaluating an operation status of an operator of a crane performing a crane work by using drive power of an engine, and this crane operation evaluation device includes: a display device provided at a position of the crane that is visible to the operator and serving to display predetermined data; a detector for detecting a state of a given part of the crane; and a data control unit that, after a stopping operation of the engine, derives a first fuel consumption index for analyzing a fuel consumption efficiency of the crane work performed between the most recent start of the engine and the stop of the engine by the stopping operation and a first work index for analyzing content of such crane work, on the basis of detection data of the detector, and causes the display device to display the derived first fuel consumption index and first work index.

In this crane operation evaluation device, after a stopping operation of the engine, the first fuel consumption index for analyzing a fuel consumption efficiency of the crane work and a first work index for analyzing contents of the crane work performed in the preceding work period, that is, after the most recent start of the engine and before the engine is stopped by the stopping operation, are displayed on the display device. Therefore, the operator can sufficiently review the fuel consumption efficiency and work efficiency of the crane work that he performed himself on the basis of the contents displayed by the display device. As a result, the operator can be stimulated to improve fuel consumption efficiency and work efficiency, and thereby the total cost of the crane work can be reduced. In addition, in this crane operation evaluation device, since the first fuel consumption index and first work index are displayed on the display device after the stopping operation of the engine, the operator can concentrate his attention on the particular crane work as this work is being performed, but after the stopping operation of the engine, the operator can concentrate his attention only on checking the first fuel consumption index and first work index that have been displayed on the display device. Therefore, the operator can sufficiently maintain the accuracy of the crane work and also review the contents of the work that he performed himself. As a consequence, with the present crane operation evaluation device, the operator can sufficiently maintain the accuracy of the crane work and also review the work contents, and the total cost of the crane work can be reduced.

In the above-described crane operation evaluation device, the first fuel consumption index preferably includes at least one of a fuel amount consumed per one suspension work in a crane work performed between the most recent start of the engine and the stop of the engine by the stopping operation and a fuel amount consumed in such crane work per unit interval of moment-time that is calculated by multiplying a moment, which is a product of a work radius and a suspension load of the crane, by a work time.

With such a configuration, the operator can review the fuel consumption efficiency of the crane work that he performed himself from the standpoint of at least one of the fuel amount consumed per one suspension work and the fuel amount consumed per unit interval of moment-time.

Further, in the above-described crane operation evaluation device, the first work index preferably includes at least one of a number of suspension works performed per unit time in a crane work performed between the most recent start of the engine and the stop of the engine by the stopping operation and a value per unit work time of a moment-time that is calculated by multiplying a moment, which is a product of a work radius and a suspension load of the crane in the crane work, by a work time.

With such a configuration, the operator can review the work efficiency of the crane work that he performed himself from the standpoint of at least one of the number of suspension works performed per unit time and the value of a moment-time per unit time.

Further, in the above-described crane operation evaluation device, the data control unit preferably derives, after the stopping operation of the engine, a second fuel consumption index for analyzing a fuel consumption efficiency of a crane work performed between the first start of the engine in a day in which the engine has been run and the stop of the engine by the stopping operation, and a second work index for analyzing content of the crane work, and displays the derived second fuel consumption index and second work index on the display device.

With such a configuration, the operator can review together the fuel consumption efficiency and work efficiency from the very first crane work in the present day to the most recent crane work that has just been stopped, on the basis of the second fuel consumption index and the second work index.

In this case, it is preferred that the crane has an operation lever allowing the operator to operate each part of the crane to accomplish a crane work, and the second work index includes at least one of an accumulated total number of suspension works, an accumulated value of moment-time that is derived by multiplying a moment, which is a product of a work radius and a suspension load of the crane, by a work time, and an accumulated total operation time of the operation lever and a distribution of an operation interval of the operation lever, between the first start of the engine and the stop of the engine by the stopping operation.

With such a configuration, the operator can review the work efficiency after the very first crane work to the most recent crane work that he performed himself in the present day from at least one standpoint from among the accumulated total number of suspension works, the accumulated value of moment-time, and the accumulated total operation time of the operation lever and the distribution of the operation interval of the operation lever.

In the configuration in which the data control unit derives the second fuel consumption index and displays the derived second fuel consumption index on the display device, the second fuel consumption index preferably includes a revolution speed distribution of the engine between the first start of the engine in a day in which the engine has been run and the stop of the engine by the stopping operation.

With such a configuration, the operator can review the fuel consumption efficiency from the very first crane work to the most recent crane work that he performed himself in the present day from the standpoint of the revolution speed distribution of the engine. Further, with such a configuration, since the revolution speed distribution of the engine is displayed on the display device, the operator can immediately recognize whether the engine has been controlled to match the work amount in the works performed from the very first crane work to the most recent crane work that he performed himself in this day.

In this case, it is preferred that the data control unit extracts a portion of the revolution speed distribution of the engine which corresponds to the specific operation time of the crane, processes the portion statistically, and causes the display device to display the statistically processed data.

With such a configuration, the revolution speed distribution of the engine during a specific operation of the crane, for example, during an operation that requires no power, such as an operation of lowering a raising/lowering member or an operation of dropping a suspended loading part, can be extracted and displayed on the display device. By observing the engine revolution speed distribution during the operation that requires no power, this distribution being displayed on the display device, the operator can easily verify that fuel is unnecessarily consumed during such operation requiring no power.

As described hereinabove, with the present embodiment, the operator can sufficiently maintain the accuracy of crane work and also review the work contents, and the total cost of the crane work can be reduced.

The invention claimed is:

1. A crane operation evaluation device for evaluating an operation status of an operator of a crane performing a crane work by using drive power of an engine, the crane operation evaluation device comprising:

a display device provided at a position of the crane that is visible to the operator and serving to display predetermined data;

a detector for detecting a state of a given part of the crane; and a data control unit that, after a stopping operation of the engine, derives a first fuel consumption index for analyzing a fuel consumption efficiency of the crane work performed in the entire period between the most recent start of the engine before the stopping operation of the engine and a stop of the engine by the stopping operation, and a first work index for analyzing content of the crane work performed in the entire period between the most recent start of the engine before the stopping operation of the engine and the stop of the engine by the stopping operation, on the basis of detection data of the detector, and causes the display device to display the derived first fuel consumption index and first work index, wherein the first fuel consumption index includes a fuel consumption amount per unit interval of moment-time in the entire period, and the data control unit calculates a moment by multiplying a work radius of the crane by a suspension load of the crane, calculates the moment-time by multiplying the calculated moment by a corresponding work time, calculates an accumulated total moment-time in the entire period, and calculates the fuel consumption amount per unit interval of the moment-time by dividing a fuel amount consumed in the crane work performed in the entire period by the accumulated total moment-time.

2. The crane operation evaluation device according to claim 1, wherein the first fuel consumption index includes a fuel amount consumed per one suspension work in a crane work performed between the most recent start of the engine and the stop of the engine by the stopping operation in addition to the fuel consumption amount per unit interval of the moment-time.

3. The crane operation evaluation device according to claim 1, wherein the first work index includes at least one of a number of suspension works performed per unit time in a crane work performed between the most recent start of the engine and the stop of the engine by the stopping operation and a value per unit work time of a moment-time that is calculated by multiplying a moment, which is a product of a work radius and a suspension load of the crane in the crane work, by a work time.

4. The crane operation evaluation device according to claim 1, wherein the data control unit derives, after the stopping operation of the engine, a second fuel consumption index for analyzing a fuel consumption efficiency of a crane work performed between the first start of the engine in a day in which the engine has been run and the stop of the engine by the stopping operation, and a second work index for analyzing content of the crane work, and displays the derived second fuel consumption index and second work index on the display device.

5. The crane operation evaluation device according to claim 4, wherein the crane has an operation lever allowing the operator to operate each part of the crane to accomplish a crane work, and the second work index includes at least one of an accumulated total number of suspension works, an accumulated value of moment-time that is derived by multiplying a moment, which is a product of a work radius and a suspension load of the crane, by a work time, and an accumulated total operation time of the operation lever and a distribution of an operation interval of the operation lever, between the first start of the engine and the stop of the engine by the stopping operation.

6. The crane operation evaluation device according to claim 4, wherein the second fuel consumption index includes a revolution speed distribution of the engine between the first start of the engine in a day in which the engine has been run and the stop of the engine by the stopping operation.

7. The crane operation evaluation device according to claim 6, wherein the data control unit extracts a portion of the revolution speed distribution of the engine which corresponds to the specific operation time of the crane, processes the portion statistically, and causes the display device to display the statistically processed data.

* * * * *